US012277361B2

(12) United States Patent
Ive et al.

(10) Patent No.: US 12,277,361 B2
(45) Date of Patent: *Apr. 15, 2025

(54) WEARABLE DEVICE FOR FACILITATING ENHANCED INTERACTION

(71) Applicant: Apple Inc., Cupertino, CA (US)

(72) Inventors: Jonathan Ive, San Francisco, CA (US); Julian Hoenig, Lisbon (PT); Julian Jaede, San Jose, CA (US); Seung Wook Kim, San Jose, CA (US); Chris Wilson, San Francisco, CA (US); William A. Sorrentino, III, Mill Valley, CA (US); Alan C. Dye, San Francisco, CA (US); Stephen O. Lemay, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,659

(22) Filed: Sep. 25, 2023

(65) Prior Publication Data

US 2024/0012600 A1 Jan. 11, 2024

Related U.S. Application Data

(63) Continuation of application No. 16/010,373, filed on Jun. 15, 2018, now Pat. No. 11,861,255.

(Continued)

(51) Int. Cl.
*G06F 3/14* (2006.01)
*G06T 3/18* (2024.01)
(Continued)

(52) U.S. Cl.
CPC ............ *G06F 3/1423* (2013.01); *G06T 11/60* (2013.01); *G06V 20/20* (2022.01); *G06V 40/174* (2022.01); *G06T 3/18* (2024.01); *G06T 11/001* (2013.01)

(58) Field of Classification Search
CPC ......... G06T 3/18; G06T 11/001; G06T 11/60; G06F 3/1423; G06V 20/20; G06V 40/174
See application file for complete search history.

(56) References Cited

U.S. PATENT DOCUMENTS 8,704,879 B1 4/2014 Cheng et al.
8,957,835 B2 2/2015 Hoellwarth
(Continued)

FOREIGN PATENT DOCUMENTS

EP 2981070 2/2016

OTHER PUBLICATIONS

Author Unknown, Artefact Light YR Concept Diagram, 1 page, at least as early as Jan. 2018.
(Continued)

*Primary Examiner* — Daniel F Hajnik
*Assistant Examiner* — Jed-Justin Imperial
(74) *Attorney, Agent, or Firm* — Brownstein Hyatt Farber Schreck, LLP

(57) ABSTRACT

Wearable head-mounted displays, such as virtual reality systems, present immersive experiences and environments to a wearer. However, the head-mounted displays, as well as the immersive environments that they produce, limit the wearer's ability to interact with outside observers. For example, a wearer may not be able to see outside observers, and outside observers may not have any insight to what the wearer is experiencing or where the wearer's attention is directed. Accordingly, a wearable electronic device may include an outward-facing display configured to display information to outside observers, such as images of the wearer's face or images that represent or indicate the state of the wearer and/or the head mounted display.

20 Claims, 23 Drawing Sheets

Related U.S. Application Data

(60) Provisional application No. 62/521,184, filed on Jun. 16, 2017.

(51) Int. Cl.
  *G06T 11/00* (2006.01)
  *G06T 11/60* (2006.01)
  *G06V 20/20* (2022.01)
  *G06V 40/16* (2022.01)

(56) References Cited

U.S. PATENT DOCUMENTS

| | | | |
|---|---|---|---|
| 9,046,999 B1 | 6/2015 | Teller et al. | |
| 9,213,185 B1 | 12/2015 | Starner et al. | |
| 9,341,849 B2 | 5/2016 | Wong et al. | |
| 9,429,759 B2 | 8/2016 | Hoellwarth | |
| 9,482,869 B2 | 11/2016 | Hoellwarth | |
| 9,595,237 B2 | 3/2017 | Hoellwarth | |
| 9,646,573 B2 | 5/2017 | Hoellwarth | |
| 9,740,282 B1 | 8/2017 | McInerny et al. | |
| 9,749,451 B2 | 8/2017 | Hoellwarth | |
| 9,874,755 B2 | 1/2018 | Tempel et al. | |
| 9,927,614 B2 | 3/2018 | Vallius | |
| 9,959,678 B2 | 5/2018 | Katz et al. | |
| 10,156,896 B2 | 12/2018 | Lee et al. | |
| 10,168,778 B2 | 1/2019 | Kazansky et al. | |
| 10,306,036 B2 | 5/2019 | Hoellwarth | |
| 10,306,037 B2 | 5/2019 | Hoellwarth | |
| 10,306,038 B2 | 5/2019 | Hoellwarth | |
| 2006/0170669 A1 | 8/2006 | Walker et al. | |
| 2010/0079356 A1 | 4/2010 | Hoellwarth | |
| 2010/0079426 A1* | 4/2010 | Pance | G09G 5/00 345/207 |
| 2010/0162149 A1 | 6/2010 | Sheleheda et al. | |
| 2011/0169911 A1 | 7/2011 | Gabura et al. | |
| 2011/0169928 A1 | 7/2011 | Gassel et al. | |
| 2011/0185057 A1 | 7/2011 | Waugaman et al. | |
| 2011/0194029 A1 | 8/2011 | Herrmann et al. | |
| 2011/0304629 A1 | 12/2011 | Winchester | |
| 2012/0050140 A1 | 3/2012 | Border et al. | |
| 2012/0050141 A1 | 3/2012 | Border et al. | |
| 2012/0050143 A1 | 3/2012 | Border et al. | |
| 2012/0182206 A1 | 7/2012 | Cok et al. | |
| 2012/0223956 A1 | 9/2012 | Saito et al. | |
| 2012/0321279 A1 | 12/2012 | Quan et al. | |
| 2013/0044128 A1 | 2/2013 | Liu et al. | |
| 2013/0117377 A1 | 5/2013 | Miller | |
| 2013/0154906 A1 | 6/2013 | Braun et al. | |
| 2014/0160250 A1 | 6/2014 | Pomerantz et al. | |
| 2014/0232816 A1 | 8/2014 | Wilson et al. | |
| 2014/0361977 A1 | 12/2014 | Stafford et al. | |
| 2014/0368537 A1 | 12/2014 | Salter et al. | |
| 2015/0067580 A1 | 3/2015 | Um et al. | |
| 2015/0138065 A1 | 5/2015 | Alfieri | |
| 2015/0177906 A1 | 6/2015 | Yairi et al. | |
| 2015/0253573 A1 | 9/2015 | Sako et al. | |
| 2015/0378161 A1 | 12/2015 | Bailey et al. | |
| 2015/0379896 A1 | 12/2015 | Yang et al. | |
| 2016/0018655 A1* | 1/2016 | Imoto | G06F 3/147 345/8 |
| 2016/0054565 A1 | 2/2016 | Izumihara et al. | |
| 2016/0110868 A1 | 4/2016 | Cheng et al. | |
| 2016/0116979 A1 | 4/2016 | Border et al. | |
| 2016/0161746 A1 | 6/2016 | Ahearn | |
| 2016/0210783 A1 | 7/2016 | Tomlin et al. | |
| 2016/0313790 A1 | 10/2016 | Clement et al. | |
| 2016/0328875 A1 | 11/2016 | Fang et al. | |
| 2016/0350973 A1 | 12/2016 | Shapira et al. | |
| 2016/0357318 A1 | 12/2016 | Chan et al. | |
| 2017/0068500 A1 | 3/2017 | Rochford et al. | |
| 2017/0090851 A1 | 3/2017 | Takano et al. | |
| 2017/0206691 A1 | 7/2017 | Harrises et al. | |
| 2017/0230640 A1 | 8/2017 | Rochford et al. | |
| 2017/0315608 A1 | 11/2017 | Shanware | |
| 2017/0326457 A1 | 11/2017 | Tilton et al. | |
| 2017/0339372 A1 | 11/2017 | Valli | |
| 2018/0004478 A1* | 1/2018 | Chen | A63F 13/26 |
| 2018/0005429 A1 | 1/2018 | Osman | |
| 2018/0024799 A1 | 1/2018 | Jarvenpaa et al. | |
| 2018/0031844 A1 | 2/2018 | Decreton et al. | |
| 2018/0075659 A1 | 3/2018 | Browy et al. | |
| 2018/0082482 A1 | 3/2018 | Motta et al. | |
| 2018/0088323 A1 | 3/2018 | Bao et al. | |
| 2018/0095636 A1 | 4/2018 | Valdivia et al. | |
| 2018/0096533 A1 | 4/2018 | Osman | |
| 2018/0101227 A1 | 4/2018 | Frueh et al. | |
| 2018/0101994 A1 | 4/2018 | Da Veiga et al. | |
| 2018/0136471 A1 | 5/2018 | Miller et al. | |
| 2018/0157333 A1 | 6/2018 | Ross et al. | |
| 2018/0164587 A1 | 6/2018 | Nakamura et al. | |
| 2018/0182141 A1 | 6/2018 | Caballero | |
| 2018/0247676 A1 | 8/2018 | Raphael et al. | |
| 2018/0288354 A1 | 10/2018 | Anderson et al. | |
| 2018/0314323 A1 | 11/2018 | Mikhailov et al. | |
| 2018/0324177 A1 | 11/2018 | Wang et al. | |
| 2018/0335929 A1 | 11/2018 | Scapel et al. | |
| 2019/0116252 A1 | 4/2019 | Hoellwarth | |
| 2019/0235246 A1 | 8/2019 | Hu et al. | |
| 2019/0235621 A1 | 8/2019 | Hu et al. | |
| 2019/0371028 A1 | 12/2019 | Harrises et al. | |
| 2020/0225734 A1 | 7/2020 | Magnusson et al. | |

OTHER PUBLICATIONS

Author Unknown, Artefact Shadow YR Concept Diagram, 1 page, at least as early as Jan. 2018.

Author Unknown, "Light," 1 page, at least as early as Jan. 2018.

Author Unknown, "YR 2020: A More Inclusive Vision for Virtual Reality," 25 pages, Mar. 2016.

Chan et al., FrontFace: Facilitating Communication Between HMO Users and Outsiders Using Front-Facing Screen HMDs, MobileHCI '17, Sep. 4-7, 2017, 5 pages, Vienna, Austria.

Chen et al., U.S. Appl. No. 62/357,348.

Ens et al., Candid Interaction: Revealing Hidden Mobile and Wearable Computing Activities, UIST '15, Nov. 8-11, 2015, 10 pages, Charlotte, NC, USA.

Falk et al., The BubbleBadge: A Wearable Public Display, PLAY: Applied Research on Art and Technology, May 29, 2014, 3 pages, Gothenburg, Sweden.c.

Frueh et al., Headset Removal for Virtual and Mixed Reality, SIGGRAPH '17 Talks, 2 pages, Los Angeles, CA, USA.

Gugenheimer et al., FaceDisplay: Enabling Multi-User Interaction for Mobile Virtual Reality, CHI '17, May 6-11, 2017, 4 pages, Denver, CO, USA.

Gugenheimer et al., FaceDisplay: Towards Asymmetric Multi-User Interaction for Nomadic Virtual Reality, CHI 2018, Apr. 21-26, 2018, 13 pages, Montreal, QC, Canada.

Hamilton, "Google Can Recreate Your Face For Better Mixed Reality Footage", https//ur:2lorn::lvr.corn/ooogleis-recnxitino—facGs-nm,v, Feb. 21, 2017, 5 pages.

Hamilton, "Google Can Recreate Your Face For Better Mixed Reality Footage," httQs://u.Qloadvr,corn/aoogle-is-recreatina-faces-now/, 6 pages, Feb. 21, 2017.

Li et al., "Interactive Two-Sided Transparent Displays: Designing for Collaboration", https://vvww resGarchgate.nettpublication/266658 i 12, Jun. 2014, 10 pages.

Lindlbauer, "Combing Shape-Changing Interfaces and Spatial Augmented Reality Enables Extended Object Appearance", https//youtube/uvvBJav3sM, May 7, 2016, 12 pages.

Mai et al., Transparent HMO: Revealing the HMO User's Face to Bystanders, MUM 2017, Nov. 26-29, 2017, 6 pages, Stuttgart, Germany.

Misawa et al., Wearing Another's Personality: A Human-Surrogate System with a Telepresence Face, ISWC '15, Sep. 7-11, 2015, 8 pages, Osaka, Japan.

Osawa et al., Emotional Cyborg: Human Extension with Agency for Emotional Labor, HRI '14, Mar. 3-6, 2014, 1 page, Bielefed, Germany.

(56) References Cited

OTHER PUBLICATIONS

Pohl et al., "See what I see: concepts to improve the social acceptance of HMDs," Intel Corporation, 2 pages, at least as early as Jan. 2018.
Pohl et al., See what I see: concepts to improve the social acceptance of HMDs, IEEE YR 2016, 2 pages.
YouTube, "Augmented Reality for Children's Coloring Books", 1ttQs://www.youtubG.com/watcl,?v",0ESE•1vsTa-E, Jun. 13, 2017, 2 pages.
YouTube, "Drum Pants at Augmented World Expo 2013", https//youtube/Y6dHObO!3vv, Jun. 8, 2013, 2 pages.

* cited by examiner

WEARABLE DEVICE FOR FACILITATING ENHANCED INTERACTION

CROSS-REFERENCE TO RELATED APPLICATION(S)

This application is a continuation patent application of U.S. patent application Ser. No. 16/010,373, filed Jun. 15, 2018 and titled "Wearable Device for Facilitating Enhanced Interaction," which is a nonprovisional patent application of and claims the benefit of U.S. Provisional Patent Application No. 62/521,184, filed Jun. 16, 2017 and titled "Wearable Device for Facilitating Enhanced Interaction," the disclosures of which are hereby incorporated herein by reference in their entireties.

FIELD

The described embodiments relate generally to wearable electronic devices and, more particularly, to head-mounted displays (HMDs) with both internal and external displays. The external display may facilitate interaction between a wearer and another person or an environment.

BACKGROUND

Head-mounted displays (HMDs) may be used to present virtual content and experiences to a user. HMDs take various forms, including goggles, helmets, masks, visors, glasses, and the like. For example, HMDs may provide "virtual reality" experiences in which an HMD presents a virtualized environment to a user via one or more screens or other display components in the HMD. HMDs may also or instead provide "augmented reality" or "mixed reality" in which both virtual and real world objects may be visible to the user via the HMD. This may be achieved either by converting real world objects to a virtualized representation (e.g., a photograph or video) for display on a screen in the HMD, or by overlaying or otherwise displaying virtual objects in a user's field of vision (e.g., via retinal projectors) while the user can still see the real-world environment. Due to the interactive, immersive nature of the environments presented to a wearer via an HMD, as well as the fact that the HMD may cover the wearer's eyes, wearers can become completely immersed in the virtualized experience. These factors can reduce the wearer's awareness of and engagement with the real-world environment, and reduce the ability of external observers to interact and engage with the wearer.

SUMMARY

A wearable electronic device includes a housing and a wearer-facing display configured to display a first visual output to a wearer of the wearable electronic device. The wearable electronic device may also include an outward-facing display configured to display a second visual output to an observer of the wearer. The first and second visual outputs may be different from one another. For example, the first visual output displayed to the wearer may be an at least partially virtual environment, and the second visual output displayed to the observer may be an image representative of the wearer or any other suitable interface. Because the wearable electronic device has both a wearer-facing and an outward-facing display, which can each present real-time information and images, the wearable electronic device facilitates increased interaction between the wearer and the external observer.

A wearable electronic device includes a housing, a wearer-facing camera positioned in the housing and configured to capture first images of a wearer, and an outward-facing display positioned in the housing and configured to display second images based on the captured images. The wearable electronic device may further include a processor operatively coupled to the wearer-facing camera and the outward-facing display and configured to modify the captured first images to produce the second images.

The wearable electronic device may further include an outward-facing sensor configured to detect an environmental condition of an environment surrounding the wearable electronic device, and the processor may be further configured to modify the captured first images based on the environmental condition. The environmental condition may be a lighting condition, and the processor may be further configured to modify the captured first images to substantially match the lighting condition. The environmental condition may be a presence of an observer, and the processor may be further configured to determine whether the observer matches a known contact of the wearer and, in response to determining that the observer matches a known contact of the wearer, modify the captured first images by obscuring identifiable physical features of the wearer.

The second images may have the same content as the first images. The first images may include video images of the wearer's eyes, and the second images may include video images of different eyes that are coordinated with the video images of the wearer's eyes.

A wearable electronic device includes a housing, a first camera positioned in the housing and configured to capture images of a wearer, and a second camera positioned in the housing and configured to capture images of an observer. The wearable electronic device may also include a wearer-facing display positioned in the housing and configured to display first visual output based on the images of the observer, an outward-facing display positioned in the housing and configured to display second visual output based on the images of the wearer, and a processor operatively coupled to the first camera, the second camera, the wearer-facing display, and the outward-facing display.

The processor may be configured to generate an at least partially virtual scene for display on the wearer-facing display, and integrate the images of the observer into the at least partially virtual scene. The processor may be configured to generate an at least partially virtual scene for display on the wearer-facing display, and cause the images of the observer to be displayed in a discrete window that overlays the at least partially virtual scene. The processor may be configured to colorize the images of the wearer, thereby producing colorized images of the wearer, and the first visual output may include the colorized images of the wearer. The processor may be configured to cause the first visual output and the second visual output to be displayed at substantially the same time.

The processor may be configured to analyze the captured images to detect a first physical characteristic of the wearer, determine whether the first physical characteristic is indicative of a particular expression, and, in accordance with a determination that the first physical characteristic is indicative of the particular expression, produce the second visual output by modifying the captured images to exaggerate a second physical characteristic of the wearer. The processor may be further configured to, in accordance with a determination that the first physical characteristic is not indicative of the particular expression, produce the second visual output without exaggerating the second physical characteristic of the wearer. The first physical characteristic and the second physical characteristic may be the same physical characteristic. The first physical characteristic and the second physical characteristic may be a size of an eye.

A wearable electronic device includes a housing, a camera positioned in the housing and configured to capture images of a wearer, a sensor configured to detect an environmental condition of an environment surrounding the wearable electronic device, and an outward-facing display positioned in the housing and configured to display visual output based on the captured images. The sensor may be selected from the group consisting of: a light detection and ranging sensor; a radio detection and ranging sensor; an optical object detection sensor; and an acoustic object detection sensor.

Detecting the environmental condition may include detecting a position of an observer relative to the outward-facing display, and the wearable electronic device may be configured to produce the visual output by skewing and/or stretching the captured images in accordance with the detected position. The wearable electronic device may be configured to periodically update the detected position of the observer relative to the outward-facing display and periodically update the visual output by skewing and/or stretching the captured images in accordance with the updated detected position.

A method of operating a head-mounted display may include capturing, with an imaging device attached to the head-mounted display, a first image of a portion of a wearer of the head-mounted display, and displaying, on an outward-facing display of the head-mounted display, a second image based on the first image. The portion of the wearer may include a portion of the wearer that is covered by the head-mounted display. The method may further include displaying, on an inward-facing display, a scene of an at least partially virtual environment, and the operations of capturing the first image and displaying the second image occur when the head-mounted display is in a first mode of operation. The method may further include, when the head-mounted display is in a second mode of operation, displaying on the outward-facing display a third image corresponding to the scene being displayed on the inward-facing display.

The method may further include modifying the first image to produce the second image. Modifying the first image may include changing a parameter selected from the group consisting of: hue, contrast, brightness, and saturation.

The method may further include analyzing the first image to determine an emotional state of the wearer, and selecting the second image from a group of candidate images based on the determined emotional state of the wearer.

A wearable system may include a display facing away from a wearer and configured to display information that enables outward interactions with people in a real-world environment. In a first mode of operation, the system may display, on the display, a first image representative of the first mode of operation. In a second mode of operation that is different than the first mode of operation, the system may display, on the display, a second image representative of the second mode of operation. The display may be a display system other than a binary indicator.

The first image may include shapes representative of the wearer's eyes, and the second image comprises an image of the wearer's eyes. The first image may include first shapes representative of the wearer's eyes, and the second image may include second shapes representative of the wearer's eyes and different from the first shapes.

In a third mode of operation that is different than the first and second modes of operation, the system may display, on the display, a third image representative of the third mode of operation. The third mode of operation may correspond to a do-not-disturb mode.

The wearable system may further include an inward-facing display configured to present an at least partially virtual environment to the wearer. The first mode of operation may correspond to the inward-facing display presenting a fully virtual environment, and the second mode of operation may correspond to the inward-facing display presenting images of the real-world environment.

A virtual reality system capable of operating in multiple viewing modes may include a first display configured to internally display content to a wearer, and a second display configured to externally display content away from the wearer. In a first viewing mode, content displayed on the second display may be selected based on content being displayed on the first display and may be different from the content being displayed on the first display.

The content displayed on the second display may include a shape representative of an eye, and the shape may be selected from a group of candidate shapes, each candidate shape corresponding to a particular viewing mode.

The first viewing mode may be a virtual reality mode, and the content displayed on the first display may be a fully virtual environment. The first viewing mode may be a pass-through mode, and the content displayed on the first display may include images of the real-world environment. The first viewing mode may be an augmented reality mode, and the content displayed on the first display may include both virtualized elements and images of the real-world environment.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
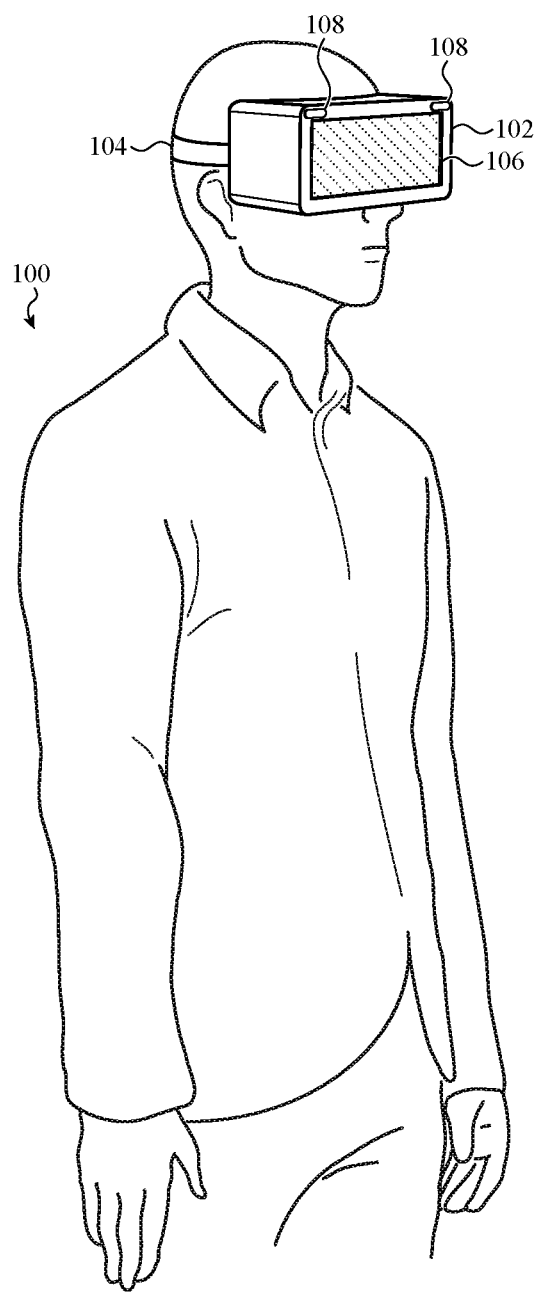
FIG. 1 depicts a head-mounted display (HMD) being worn by a user.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to head-mounted displays (HMDs), and more particularly, to HMDs that have an outward-facing output system (including display(s), a speaker(s), or the like) in addition to wearer-facing displays to increase the options for interacting with others while wearing the HMD. In particular, HMDs that completely cover a wearer's eyes (or even entire head), such as those with displays or projectors enclosed in an opaque housing, may provide an immersive experience for the wearer. Further, HMDs may present environments and images to the wearer that are highly engaging and immersive, so much so that the wearer may be largely oblivious to what is happening in the real-world environment. For example, not only might an HMD block a wearer's view of the real-world environment, but a virtual-reality environment presented by the HMD may consume a wearer's attention and focus, making the wearer less likely to hear people or be able to respond or react to the real-world environment.

Further, such HMDs limit the ability of people in the real-world environment to recognize or interact with the wearer, as the wearer's eyes are usually completely covered and the wearer's attention may be entirely directed to a virtual environment. For example, even if a HMD allows a wearer to see the external environment (e.g., via an external camera transmitting images to a wearer-facing display), a person who is in front of the wearer cannot determine if the wearer is able to see or perceive the real world environment, or if they are immersed in a virtual environment. And even if a person and the wearer are interacting by speaking, the wearer's eye movements and facial expressions remain largely hidden, thus removing many non-verbal cues and signals that are important for conveying information and emotion in human-to-human communications.

Accordingly, described herein are HMDs that incorporate outward-facing or outwardly-directed output systems, such as external displays (high and/or low resolution displays), speakers, or the like, that can display or otherwise present information to observers in the real-world environment. This outwardly displayed or presented information may provide a communication path that helps penetrate the otherwise immersive world of a virtual-reality environment and helps break down the physical barrier of the HMD. For example, outward-facing displays may be capable of displaying symbolic graphical information to outside observers, and speakers may allow a digital assistant to interact with another person until a wearer is able to direct his or her attention to the other person. In this way, communication between the wearer and the outside observer is restored or improved, despite the immersive and dissociative effect of the HMD and the virtual environment.

As one particular example, in cases where an HMD includes an outward-facing graphical display, aspects or images of a wearer's face may be displayed to the real-world environment, thereby improving interaction, recognition, and communication between the wearer and individuals in the real-world environment. To facilitate these improvements, an HMD may include a camera that captures images (e.g., still images or video images) of the portion of a user's face that is covered by a HMD, such as the user's eyes, eyebrows, nose, forehead, or the like. The HMD may display those captured images on the outward-facing display, allowing individuals in the real world to see the wearer's eyes and facial expressions, thereby facilitating a more natural interaction with the wearer. Moreover, the outward-facing display may also allow others to more quickly and easily recognize the person wearing the HMD, as more of their face will be perceptible. As another example, where an HMD includes a low resolution display (e.g., an LED array), the display can be used to display symbolic graphical outputs that correspond to or suggest a mood or emotion of the wearer, or that convey a mode or status of operation of the HMD. As yet another example, an HMD may include an outwardly-directed speaker that allows interaction between a digital assistant integrated with the HMD and an outside observer. These types of output systems and techniques, when integrated with an HMD (either alone or in any combination), allow more varied and robust interactions between HMD wearers and other people.

The HMD may also have outward-facing cameras or other sensors allowing the wearer of the HMD to see video or images of the real world, including people, via the internal displays of the HMD. (Such video or images may be displayed to the wearer without any modification, or they may be fully or partially integrated into the wearer's virtual environment.) Because each person can see the face and eyes of the other, the dual-display HMD effectively provides a two-way pathway for visual communication between the wearer and a person in the real world environment. Moreover, both people can experience more natural communication without requiring the wearer of the HMD to completely disengage with the virtual experience.

In addition to merely displaying a wearer's eyes or face on the outward-facing display, the HMD may enhance the visual output that is displayed on the outward-facing display in various ways. In particular, images of the user's eyes may be modified based on aspects of the real world environment, including the intensity, direction, or color of the ambient light. Accordingly, images of the wearer's eyes—which are behind an HMD and are not exposed to ambient light—can more closely match the appearance of the rest of the wearer's face. For example, a light sensor on the HMD may determine a color temperature of the real world environment and modify the color temperature of the visual output (e.g., still images or video images) on the outward-facing display to match.

The HMD may provide other enhancements or modifications of the visual output displayed via the outward-facing display. For example, instead of merely displaying a live video feed of the wearer's face or eyes, the HMD may display a cartoon or other digitally rendered face or eyes that track and/or mimic the user's eye movements, expressions, and the like. As another example, the display of the wearer's face or eyes may be modified based on aspects of the virtual environment being experienced by the wearer. Thus, if it is raining in the virtual environment, rain may be visible on or in front of the user's eyes or face, or if the wearer is playing a game in which they are a cat, the user's eyes or face (as displayed) may be modified to appear as a cat. As yet another example, the visual output may be modified based on inputs directly from the wearer. Thus, if the user expresses an emotion such as surprise (as detected by visual cues, biometric data, user-command, or any other suitable technique), the displayed eyes may be enhanced, modified, exaggerated or the like to show a cartoonish, embellished indication of surprise. Similarly, if the wearer is angry, the eyes shown in the display may be modified, exaggerated, or the like to appear red or flaming.

Thus, the immersive effect of virtual environments combined with the visually blocking effect of an HMD can impede interaction between HMD wearers and other people. The outwardly-directed output systems and techniques described herein, including outward-facing displays, help break down these barriers and enable new paths of communication and interaction between wearers and other people.

FIG. 1 depicts a wearer (also referred to as a "user") 100 wearing a head-mounted display (HMD) 102, which may be a virtual reality system that produces and/or presents at least partially virtualized environments to the wearer 100. As described herein, the HMD 102 may include outward-facing output systems that help break down the barriers to communication, recognition, and interaction that are created by HMDs and other devices that immerse a wearer in a virtual environment.

The HMD 102 is configured to be worn over the wearer's eyes and some portion of the wearer's face. The HMD 102 shown in FIG. 1 covers only a portion of the wearer's face, though other designs, shapes, and sizes are also contemplated. For example, some HMDs may cover a wearer's entire head, while others may cover the eyes and ears, and so on. The HMD 102 may be attached to the wearer 100 via a strap 104, or any other suitable mechanism.

The HMD 102 is configured to display to the wearer 100, via one or more internal or user-facing displays or visual output devices (shown in more detail in FIGS. 11A-11B and discussed below), an at least partially virtual world. For example, the HMD 102 may be configured to present to the wearer 100 a fully virtual environment (e.g., a digitally rendered video game), a mixed reality or augmented reality environment (e.g., real world elements or objects integrated in an otherwise virtual environment), or any other type of at least partially virtual environment that is mediated by the HMD 102. The HMD 102 may generate and/or present the at least partially virtual environment alone or in conjunction with other computers, components, and/or devices.

The HMD 102 also includes an external or outward-facing display 106. The outward-facing display 106 may define a display surface that faces away from the wearer, and may be configured to display visual output (e.g., still images, video images) to persons other than the wearer 100. As noted above and described herein, such visual output may include real-time or pre-captured video or still images of at least a part of the wearer's 100 face (e.g., the wearer's eyes and eyebrows). The outward-facing display 106 is discussed in greater detail with respect to FIG. 17B.

The visual output presented on the outward-facing display 106 may be unmodified (e.g., a direct video feed from an internal camera of the HMD 102, and/or other sensor data from another internal sensor), or it may be interpreted, enhanced, filtered, or otherwise modified in various ways, as described herein. The outward-facing display 106 facilitates interactions that are more natural and also provides improved facial recognition and non-verbal communication between the wearer 100 and other people.

The HMD 102 may also include other outward-facing output systems in place of or in addition to an outward-facing display 106. For example, the HMD 102 may include a speaker that allows the HMD 102 to present audio output to an external observer. The audio output may be produced automatically by a digital assistant associated with the HMD 102, or it may be presented at the request of the wearer. In the former case, the digital assistant may, for example, recognize that another person has approached the wearer and automatically tell the other person to please wait while the wearer suspends the virtual environment. In the latter case, the wearer may instruct the HMD 102 to present particular audio content to another person (or the HMD 102 may do so automatically).

As described herein, the HMD 102 may include various sensors. Some of the sensors may be configured to detect, sense, or otherwise capture information from the wearer 100. Such sensors may include wearer-facing cameras, eye-tracking sensors, biometric sensors (e.g., heart rate, blood oxygen, respiration rate, perspiration rate), motion sensors, presence sensors (e.g., to detect whether the HMD 102 is currently being worn), or the like. Information from such sensors may be used to select and/or modify visual output that is displayed via the outward-facing display 106, as described herein. For example, information from such sensors may be used to determine how and/or when to modify an image or model of the wearer so that the image or model represents or corresponds to the expression, emotion, or other state of the user. The modified image or model may then be displayed on the outward-facing display 106. Other sensors, such as sensors or sensor arrays 108, may be configured to detect, sense, or otherwise capture information from the real world environment, apart from the user. Such sensors may include outward-facing cameras, photo sensors, object detection sensors (e.g., radar sensors, light detection and ranging (LIDAR) sensors, acoustic sensors), ultrasonic sensors, light sensors, eye-tracking sensors, motion sensors, or the like, as described herein with respect to FIG. 17B.

Figure 2A:
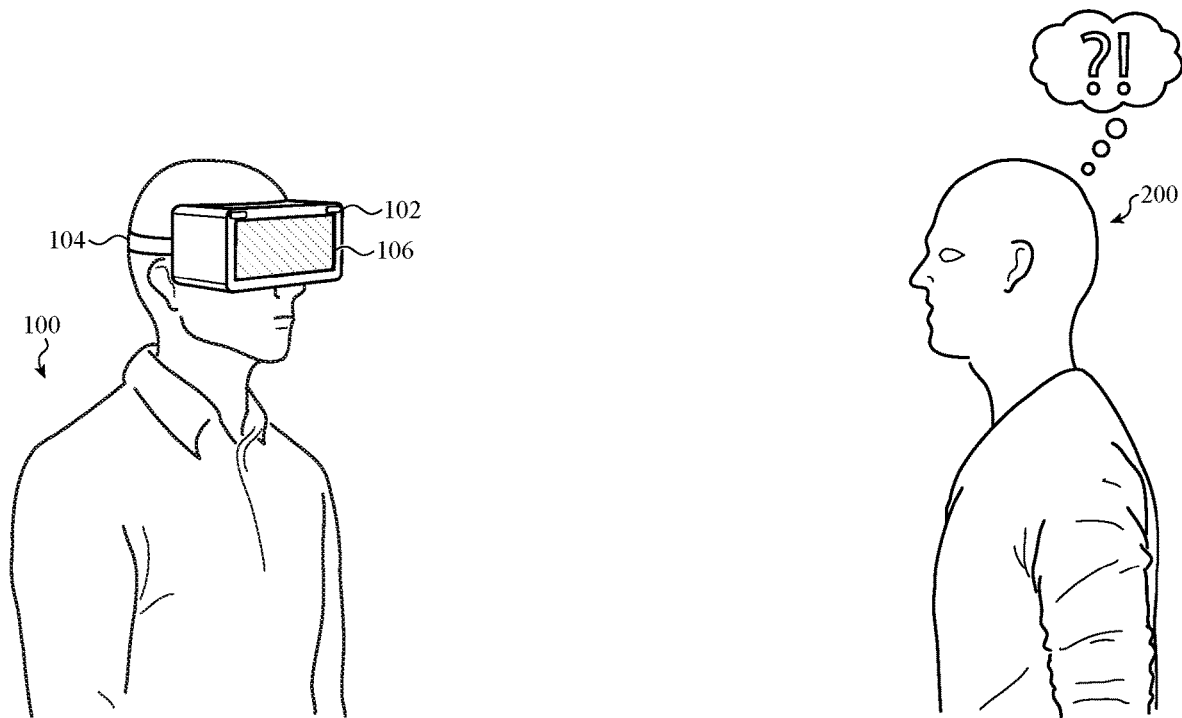
FIGS. 2A-2B depict an example interaction between a wearer of an HMD and another person.
Figure 2B:
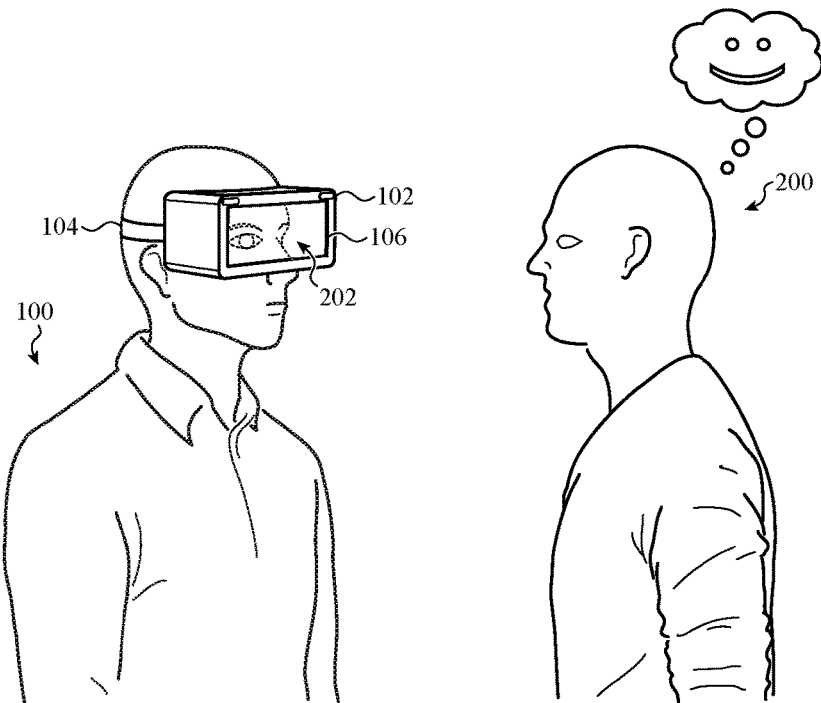

The HMD 102 shown and described with respect to FIG. 1 may be used in various ways to improve the quality and types of interactions that are possible between a wearer and external observers. In particular, and as described herein, outwardly-directed output systems such as outward-facing displays can form a tunnel through both the physical and the virtual barriers that HMDs erect between wearers and other individuals and the real-world environment more generally. FIGS. 2A-2B, for example, illustrate how an HMD 102 with an outward-facing display may achieve these results. FIGS. 2A-2B illustrate the HMD 102 in two modes of operation: a first mode in which the outward-facing display 106 is inactive (FIG. 2A); and a second mode in which the outward-facing display 106 is active and displaying visual output 202 of (or corresponding to) a portion of the wearer's face.

The interaction illustrated in FIGS. 2A-2B demonstrates how the HMD 102 may provide more natural interaction and communication between the wearer 100 and another person 200. In particular, in FIG. 2A, the wearer's attention may be fully directed to a virtual world provided by the HMD 102, and thus the outward-facing display 106 is inactive. When another person 200 approaches the wearer 100, however, the outward-facing display 106 may become active and may display a visual output 202, such as still images or a video image of the wearer's face or other suitable visual output 202. This may provide numerous benefits. For example, the other person 200 may be more likely to physically recognize the wearer 100, thus increasing the feeling of comfort and connection with the wearer 100. Further, the other person 200 can see nonverbal cues, such as gaze direction, eyelid and eyebrow movements, or other physical characteristics of the wearer 100, which may improve the quality, speed, comfort, and familiarity of an interaction between the wearer 100 and the other person 200.

While FIG. 2B shows the visual output 202 as an image of the wearer's face, other visual outputs may be provided instead of or in addition to images of the wearer's face, such as textual outputs (e.g., "do not disturb," "in virtual mode—please wait," etc.), other graphical outputs (e.g., images of what is being displayed to the wearer 100), a graphical user interface, weather information, patterns or symbols, or the like. Examples of visual outputs other than an image (e.g., video or still) of the wearer's face that may be displayed on an outward-facing display are described herein.

FIGS. 2A-2B also more generally illustrate how conventional head-mounted displays or virtual reality systems may alienate others and decrease the ability to interact and the quality of interactions with the wearer. For example, when an outward-facing display 106 is inactive, or in cases where an HMD lacks an outward-facing display, the other person 200 may have little or no indication of the wearer's state of attention (as illustrated by the question and exclamation mark in FIG. 2A). For example, the other person 200 may not be able tell whether the wearer is aware of the other person's presence, what the wearer is viewing (the real world or the virtual world), whether the wearer recognizes the other person, etc. In short, a head-mounted display without an outward-facing display (or an inactive outward-facing display) is a barrier to interaction and communication. By displaying information (e.g., images) on the outward-facing display 106, important visual cues may be seen by the other person, effectively removing or diminishing the barrier effect of the head-mounted display. For example, showing the wearer's eyes to the other person 200, as shown in FIG. 2B, provides confirmation to the other person 200 that the wearer 100 is paying attention to them and/or the real world, rather than to the virtual world. This may reduce the other person's confusion and/or discomfort with the interaction (as indicated in FIG. 2B by a happy face), and may provide a more natural way to communicate with the wearer 100.

The mode of the HMD 102, and more particularly whether or not the outward-facing display 106 is active, may be determined in any of a variety of ways. In some cases, the HMD 102 may use externally directed sensors (e.g., proximity sensors, LIDAR, presence sensors, cameras, microphones, etc.) to determine whether another person is near or within a threshold distance from the wearer 100 (e.g., within about 30 feet, 20 feet, 10 feet, 5 feet, or any other suitable distance) or to otherwise determine whether another person is attempting to interact with the wearer. In accordance with a determination that a person is within the threshold distance (or in accordance with a determination that a person is attempting to interact with the wearer), the HMD 102 may activate the outward-facing display 106 to present a visual output, such as an image of or suggestive of the wearer 100. In some cases, the HMD 102 may also include an outward-facing sensor (e.g., a camera) that can detect the gaze direction of another person. In such cases, the HMD 102 may only activate the outward-facing display 106 and/or present a visual output, as described herein, in response to detecting that the other person is looking at or towards the wearer.

In some cases, even after a person is detected nearby (e.g., within the threshold distance), the HMD 102 may activate the outward-facing display 106 only in response to detecting that the wearer 100 has directed his or her attention to the real world environment, to avoid giving a false impression of attention to the approaching person.

The HMD 102 may detect that the wearer 100 has directed his or her attention to the real world in various ways. For example, the HMD 102 may display an affordance to the wearer 100 (e.g., via an internal display of the HMD 102) offering the option of activating the outward-facing display 106, and the outward-facing display 106 may only display visual output if the wearer 100 actively commands the HMD 102 to do so.

As another example, in response to determining that a person is within a threshold distance of the wearer 100, the HMD 102 may display to the wearer 100 visual output representative of the real world environment, such as a window showing a live video feed of the real world environment and the other person 200. The window may be displayed out of the wearer's direct view so as to not disrupt the wearer's virtual experience. The HMD 102 may determine, using eye-tracking or other techniques, when and whether the wearer 100 looks at the window, and activate the outward-facing display 106 in response to determining that the wearer 100 is looking directly at the window. The HMD 102 may also delay activating the outward-facing display 106 after the wearer 100 looks at the window so that the wearer 100 can look away if he or she determines not to engage with the nearby person 200. In this way, the outward-facing display 106 can indicate to other people whether the wearer's attention is actually directed to the real world environment.

In some cases, in addition to or instead of determining whether another person is within a threshold distance of the user, the HMD 102 may determine whether a nearby person is known to the wearer. If the nearby person is not known to the wearer, the HMD 102 may not activate the outward-facing display 106, and may not notify the wearer 100 to the presence of the person. If the nearby person is known to the wearer, the HMD 102 may present visual output via the outward-facing display 106, and may notify the wearer 100 to the other person's presence. The HMD 102 may determine whether the person is known to the wearer 100 in any suitable manner. For example, the HMD 102 may compare an image of the person's face and/or body against images of individuals or contacts who are known to the wearer 100. The HMD 102 may use facial recognition, image comparison, or any other suitable technique to determine whether the captured image matches an image of a known individual. (Images of known individuals may be stored in or associated with contacts in a contact list.) The HMD 102 may also automatically determine whether the person is known to the wearer by communicating with or otherwise detecting an electronic device (e.g., a phone, smartwatch, HMD, near field communication (NFC) chip, wireless-enabled device, or the like) associated with the person. The HMD 102 may compare a digital signature, address, or other identifiable information from the person's electronic device with a list of known information to determine if the person is known to the wearer 100. Instead of or in addition to automatic person recognition, the wearer 100 may manually select whether a person is known or recognized (e.g., after viewing the person through the HMD 102).

Figure 3A:
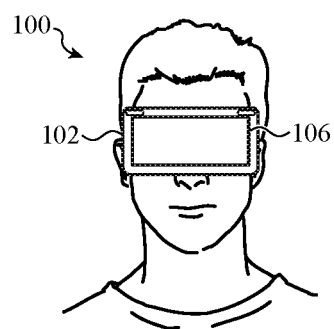
FIGS. 3A-3C depict an HMD in various modes based on whether an observer is recognized.
Figure 3B:
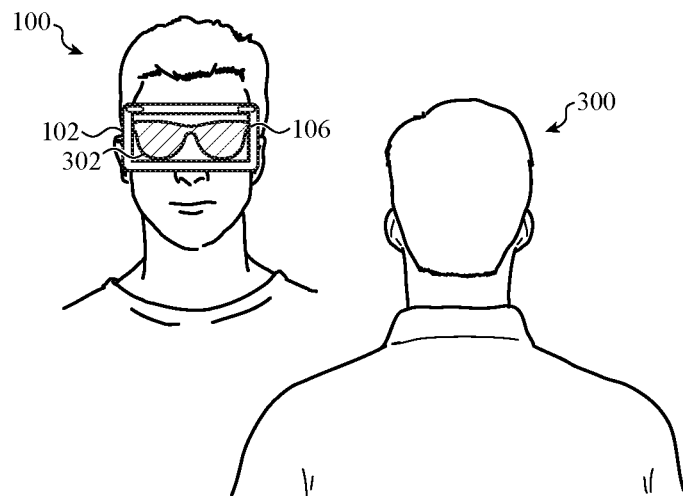

The HMD 102 may also be configured to display different visual outputs on the outward-facing display 106 depending on whether or not a nearby person is recognized (either automatically or as selected by the wearer 100). For example, FIGS. 3A-3B show the wearer and the HMD 102 in various modes depending on whether another person 300 is nearby and recognized. FIG. 3A shows the wearer 100 when no other person is within a threshold distance. Accordingly, the outward-facing display 106 may be inactive (as shown), or it may display a decorative image or video (e.g., not corresponding the wearer's face or eyes).

In FIG. 3B, another person 300 is within a threshold distance of the wearer 100. However, the other person 300 has not been recognized by the HMD 102 or the wearer 100, or the wearer 100 has manually chosen to indicate that the person 300 is not known or recognized. Optionally, the wearer 100 may have also indicated to the HMD 102 that he or she wishes to interact with the person 300. In response to the person 300 being in proximity but not being recognized, the HMD 102 displays a generic visual output 302 via the outward-facing display 106. The generic visual output 302 may be any suitable output that conveys that the wearer 100 is viewing the real world environment and can interact with the person 300, but is not an image of the wearer's face, or is an image that obscures part or all of the wearer's face, such as the eyes, eyebrows, and/or other identifiable physical features of the wearer. As shown in FIG. 3B, the generic visual output 302 is a pair of sunglasses that do not show the wearer's eyes, though other outputs are also possible, such as digitally rendered eyes that do not have the same appearance as the wearer's eyes (but which may be manipulated to reflect the wearer's real-time expression and gaze direction). In this mode, the communicative benefits of the outward-facing display 106 may be realized while both maintaining a degree of anonymity and also suggesting to the other person 300 that he or she is not recognized by the wearer.

Figure 3C:
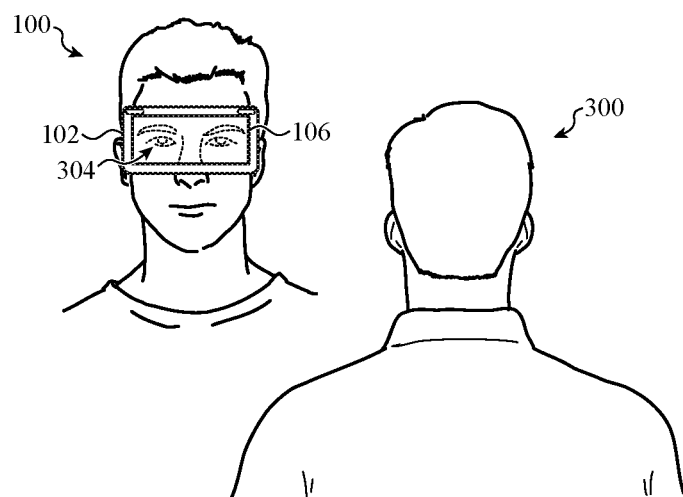

In FIG. 3C, however, the other person 300 is recognized (automatically by the HMD 102 and/or manually by the wearer 100). As such, the HMD 102 displays a visual output 304 that corresponds to the wearer's actual physical features. For example, the visual output 304 may be a live video feed of the wearer's face (or a portion thereof) captured by a camera within the HMD 102. As another example, the visual output 304 may include pre-captured images of the wearer, which may or may not be manipulated to reflect the wearer's real-time expression and gaze direction. More particularly, an image (e.g., a two-dimensional image and/or a three-dimensional rendering or representation) of the wearer 100 may be captured at a first time, such as when the wearer first dons the HMD 102. The image may be captured by a camera, sensor, or other device attached to the HMD 102, or via a separate device (e.g., a dedicated imaging system, a mobile phone, a tablet computer, or the like). When the wearer 100 is wearing the HMD 102, a wearer-facing sensor, such as a biometric sensor, camera, eye-tracking sensor, motion sensor, or the like, may detect some aspect of the wearer 100 that is indicative of an emotion, expression, or other feature. In response to detecting the aspect of the wearer 100, the HMD 102 may cause the pre-captured two- or three-dimensional image to be modified to correspond to, reflect, or otherwise be suggestive of the detected aspect. For example, if an eye-tracking sensor detects the direction of the wearer's gaze, the HMD 102 may modify the pre-captured image to reflect the wearer's detected gaze direction. As another example, if a face-mapping biometric sensor detects motion indicative of an eye blinking (or otherwise changing shape) or other facial motion, the HMD 102 may modify the pre-captured image to reflect or simulate the blinking or other motion. As yet another example, if a motion sensor detects motion of a wearer's face, the HMD 102 may capture an image (still or video) of the wearer's face in response to detecting the motion (or other triggering event), and may generate an animation of the wearer's face transitioning from the pre-captured image to the newly-captured image (possibly using the newly-captured image as the final frame of the animation). These modifications may include animating or otherwise changing the pre-captured image to show a smooth transition between states of the wearer's features.

Modifying captured images or models in this manner may reduce processing burden as compared to showing a live video feed of the wearer, and may be able to use sensing techniques that are less intrusive to the wearer than optical imaging may be. For example, optical imaging may use a light source to illuminate the wearer's face within the HMD 102 in order to capture high-quality images for a real-time video feed, which could be detrimental to the wearer's experience. Additionally, capturing real-time video data for an extended period of time may be power-intensive. By using less intrusive sensors (e.g., infrared light sources and sensors, infrared light sensors, etc.) and modifying a captured image or video segment rather than capturing and/or transmitting real-time data, a high-quality, well-lit image may be displayed on the outward-facing displays without distracting the wearer and while requiring less overall processing resources. Accordingly, it should be understood that references to "video" or the like herein encompass modification of an image or set of images, whether static or a short-duration animation or video capture segment, as discussed above. Likewise, references to modifying, changing, or otherwise altering or adjusting an image or images, transitioning between two images, and the like also encompass the foregoing.

As described above, the outward-facing display 106 may be configured to display facial features of the wearer, thereby providing a more natural interaction between the wearer and other people. FIGS. 4A-6C show various ways that physical features of a wearer may be displayed on the outward-facing display 106. For example, a camera (and/or other sensors) in the HMD 102 may capture real-time images of the portion of the wearer's face that is behind the HMD 102, which may then be displayed on the outward-facing display 106 with or without modification or manipulation. As another example, images (e.g., video or still images) of the wearer may be captured and stored for later display on the outward-facing display 106. As noted above, these pre-captured images may be modified based on attributes of the wearer, where the attributes are detected by sensors, cameras, or the like. These visual outputs may allow the wearer to communicate via facial expressions, decrease an observer's feelings of alienation and separation, and generally improve the quality of interaction between the wearer and the other person.

Figure 4A:
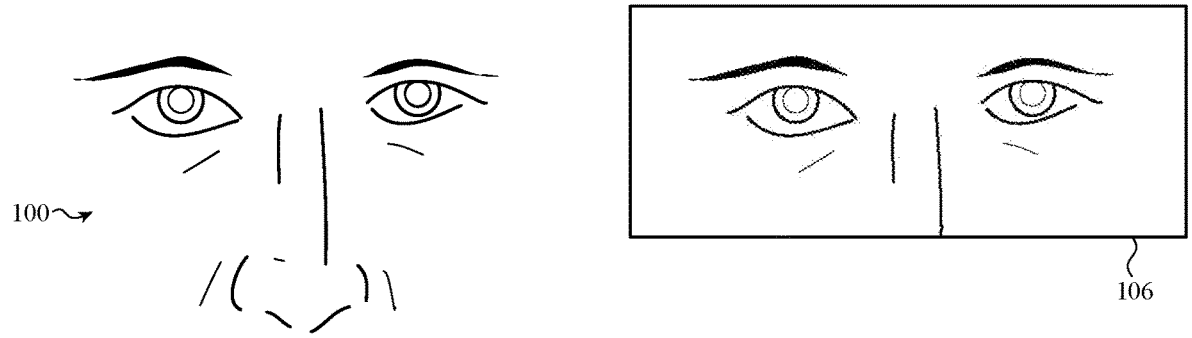
FIGS. 4A-4C depict example images displayed on an outward-facing display, based on captured images of a wearer.
Figure 4B:
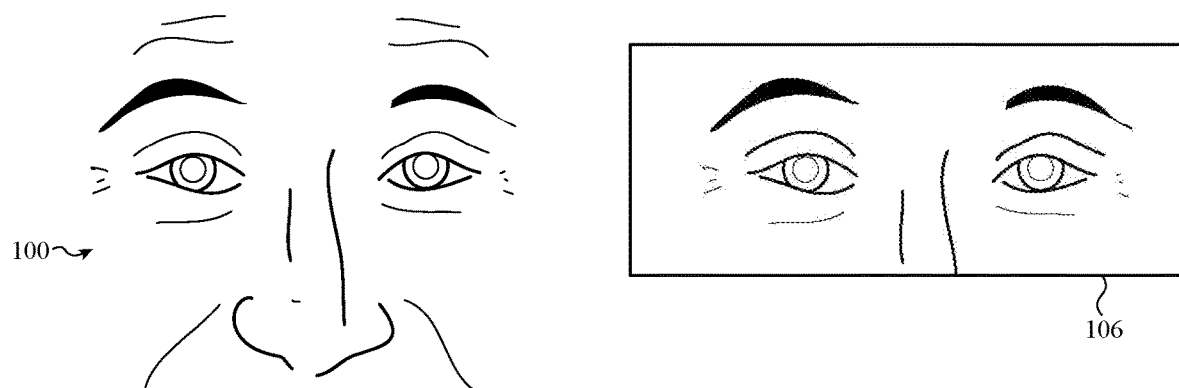
Figure 4C:
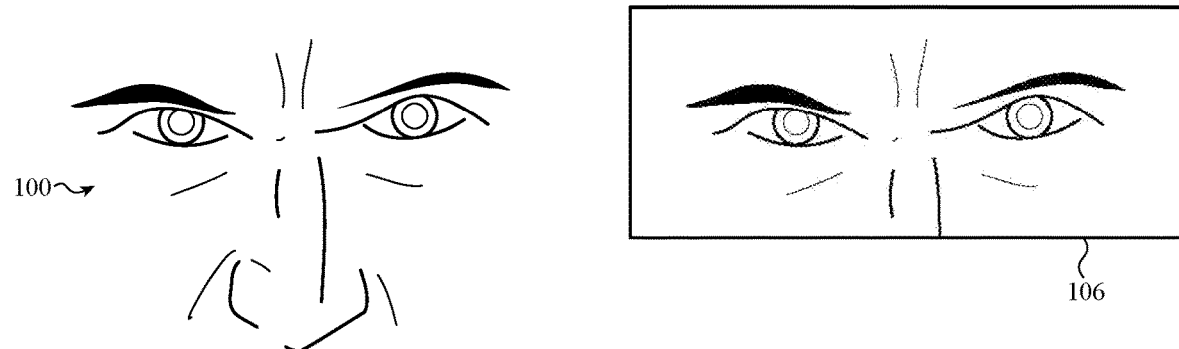

FIGS. 4A-4C show how a portion of a wearer's face may be captured by a camera and displayed as a real-time still or video image on the outward-facing display 106. FIGS. 4A-4C each show the wearer 100 on the left with a particular expression: a neutral expression in FIG. 4A, a surprised expression in FIG. 4B, and an angry expression in FIG. 4C. The right side of each figure shows what is shown on the outward-facing display 106. As shown, the displayed images are unmodified images of the wearer's face. In some cases, the images may be modified in ways that do not change the fundamental content of the image, such as changes to lighting, color, contrast, hue, or the like. The portions of the wearer's face displayed on the outward-facing display 106 (shown on the right hand side of the figures) correspond to the portions of the wearer's face that are covered by the HMD 102, including for example the wearer's eyes, eyebrows, and part of the wearer's nose and forehead. This allows the outward-facing display 106 to simulate a "transparent" HMD so that an observer essentially sees what is behind the HMD 102 and to convey highly expressive features that provide important non-verbal cues and information to observers.

Figure 5A:
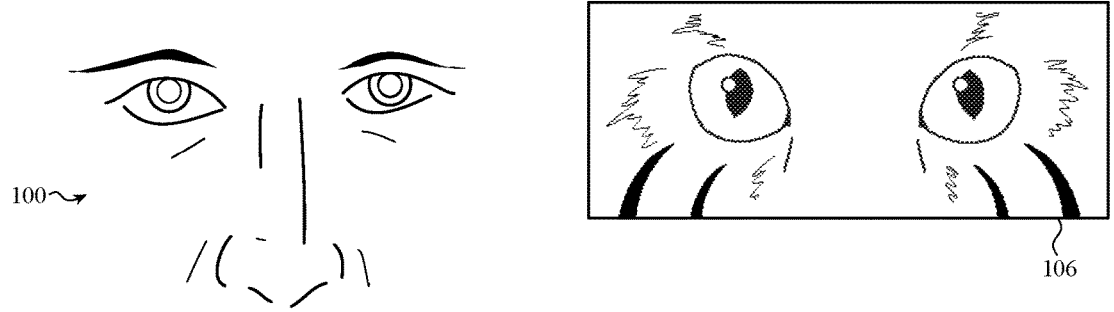
FIGS. 5A-5C depict example modified images displayed on an outward-facing display, based on captured images of a wearer.
Figure 5B:
Figure 5C:

FIGS. 5A-5C show how the HMD 102 may display a modified or embellished version of the wearer's face in which the content of the image is altered but the user's expressions are mapped or translated to a different image so that modified or embellished version of the wearer's face is coordinated with the expressions of the wearer's face and/or eyes. In particular, the HMD 102 may use a camera (and/or other sensors) to capture an image of a portion of the wearer's face. The HMD 102 may then modify the image, in real-time, to have a different appearance, while maintaining the same or similar expressions of the wearer. For example, FIGS. 5A-5C convert images of the wearer's expression, shown on the left side of the figure, to a partial animal face, while maintaining similar expressions, face and eye movements, and the like. While FIGS. 5A-5C display the relevant portion of the wearer's face as that of a cat, this is merely one example. In other cases, the HMD 102 may display portions of the wearer's face as a different animal, a cartoon, a line drawing, an emoji, an alien or other fictional being, or the like. The images displayed on the outward-facing display 106 may generally correspond to the portions of the wearer's face that are covered by the HMD 102, including for example the wearer's eyes, eyebrows, and part of the wearer's nose and forehead. Physical features displayed on the outward-facing display, such as eyes, eyebrows, noses, and the like, may be positioned to generally correspond to the position of the wearer's physical features, thus providing a substantially seamless transition from the displayed images to the wearer's actual face.

A captured image of the wearer's face may be mapped or translated to another being or object in any suitable way, thereby coordinating the outwardly displayed graphics with the wearer's actual eyes, face, expressions, and/or features. For example, in some cases, photographic manipulation is used to directly modify a captured image, such as by modifying textures, colors, shapes, angles, or overlaying other images such as eyes, glasses, eyebrows, fur, or the like. In some cases, facial and eye movements are analyzed and converted into motion vectors that are then used to modify a purely digital model of an object. For example, an eye-tracking system may capture and/or calculate vectors representing the speed and direction of motion of the wearer's eyes, and the HMD 102 may apply those vectors to the eyes of a manipulable digital model of a cat. Accordingly, the cat's eyes will appear to move at the speed and in the same direction as the wearer's eyes. Similar techniques may be used to capture motion of other parts of the wearer's face (e.g., eyebrows, nose, forehead) and apply those motions to a digital model. The same or similar techniques for mapping or translating detected attributes of a wearer to pre-captured images and/or models of the wearer. For example, detected attributes of the wearer (e.g., eye and/or facial movements) may be used to modify a pre-captured two- or three-dimensional image, model, or video of a wearer's face for display on an outward-facing display.

Figure 6A:
FIGS. 6A-6C depict example exaggerated images displayed on an outward-facing display, based on captured images of a wearer.
Figure 6A:
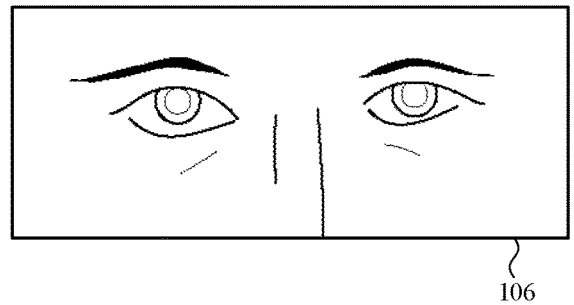
Figure 6B:
Figure 6B:
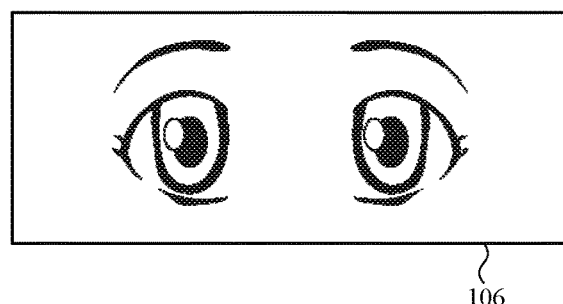
Figure 6C:
Figure 6C:
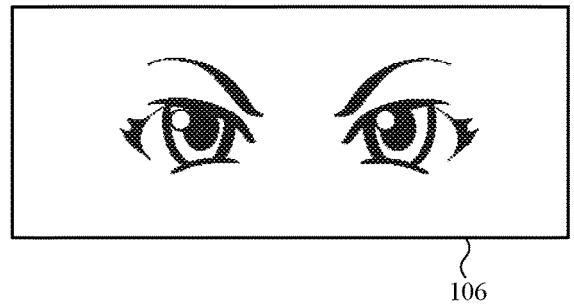

FIGS. 6A-6C show a hybrid display technique, in which some of a wearer's expressions or emotions cause the HMD 102 to display direct images of the wearer's face, while others cause the HMD 102 to display embellished or otherwise modified images representing the wearer's face. For example, as shown in FIG. 6A, a resting or neutral expression may be displayed on the outward-facing display 106 as a real-time image of the wearer's face. As shown in FIG. 6B, when the wearer 100 has a surprised expression, the HMD 102 may display cartoon eyes having a similar or analogous expression. Similarly, FIG. 6C shows the wearer 100 having an angry expression, resulting in the HMD 102 displaying cartoon eyes having a similarly angry expression. The cartoon images in FIGS. 6B-6C may be still images, or they may be moving images that track, in real-time, the wearer's expressions (e.g., they may be manipulable digital models, as described above). Where they are still images, the they may be displayed for a predetermined duration (e.g., 1 second, 2 seconds, 3 seconds), or they may be displayed as long as the wearer has the expression (or as long as the wearer 100 commands them to be displayed).

The wearer's expressions may initiate the display of certain visual outputs such as the cartoon eyes described above with respect to FIGS. 6B-6C. These expressions may be detected in any suitable way. For example, the expressions may be detected by analyzing video images of the user's face and/or eyes and comparing the images against known expressions and corresponding emotions. For example, an image analysis algorithm may associate raised eyebrows with an expression or emotion of surprise, or narrowed eyelids with an expression or emotion of anger. The HMD 102 may then select a corresponding cartoon (or other type of image, photograph, artwork, animal, or the like) to display on the outward-facing display 106. As another example, the expressions may be separately controlled by the wearer. For example, the wearer 100 may signal to the HMD 102, via any suitable input, what emotion the wearer 100 would like the HMD 102 to display on the outward-facing display. Thus, if the wearer 100 indicates that the wearer 100 is angry, the HMD 102 may display the eyes shown in FIG. 6C.

The HMD 102 may also modify or manipulate images of the wearer's face in other ways to produce a natural, lifelike appearance of the wearer's face on the outward-facing display. In particular, because the HMD 102 covers a portion of the wearer's face, that portion of the wearer's face will not be illuminated by the light in the real world environment. Accordingly, showing an unmodified, unaltered video of the wearer's face may not appear natural. For example, to even capture an image of the wearer's face behind the dark mask, the HMD 102 may use infrared light to illuminate the wearer's face without distracting the wearer or otherwise interfering with the wearer's virtual experience. Such lighting, however, may produce images dominated by unnatural looking hues or greyscale images that will not match or blend well with the portion of the wearer's face that is not covered by the HMD 102. Accordingly, the HMD 102 may modify or manipulate the captured images to better match the rest of the wearer's face and provide a better experience for people interacting with the wearer.

In some cases, the HMD 102 may apply one or more predetermined image manipulations or modifications to the captured images prior to displaying them on the outward-facing display 106. Such image manipulations may include changing a hue, contrast, brightness, or saturation of the image (or any other suitable parameter). In some cases, where captured images are monochrome or otherwise do not contain a full color range, they may be colorized. Other filters, edits, or other manipulations are also possible. Such manipulations or modifications may be applied to images of the wearer's face regardless of the surrounding real world environment.

Further, as described in further detail with respect to FIGS. 14A-14D, images of the wearer's face may be displayed on the outward-facing display such that the displayed image appears continuous with the wearer's face. More particularly, because the outward-facing display 106 may be a nonzero distance (e.g., several inches) in front of the wearer's face, displayed facial features may appear to be "in front of" the wearer's actual face, rather than continuous with the wearer's face. Accordingly, the displayed images may be modified to appear "recessed" relative to the outward-facing display, providing the illusion that the outward-facing display 106 is transparent and that external observers are actually seeing the wearer's face through the outward-facing display 106.

Figure 7A:
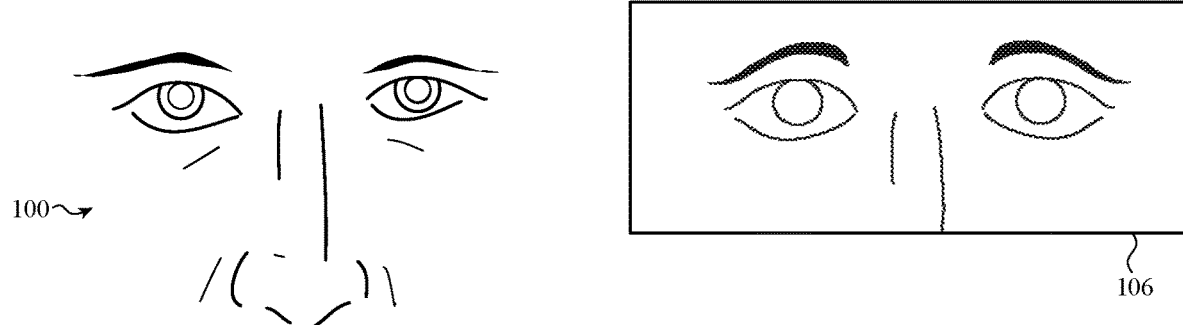
FIGS. 7A-7C depict additional example exaggerated images displayed on an outward-facing display, based on captured images of a wearer.
Figure 7B:
Figure 7C:
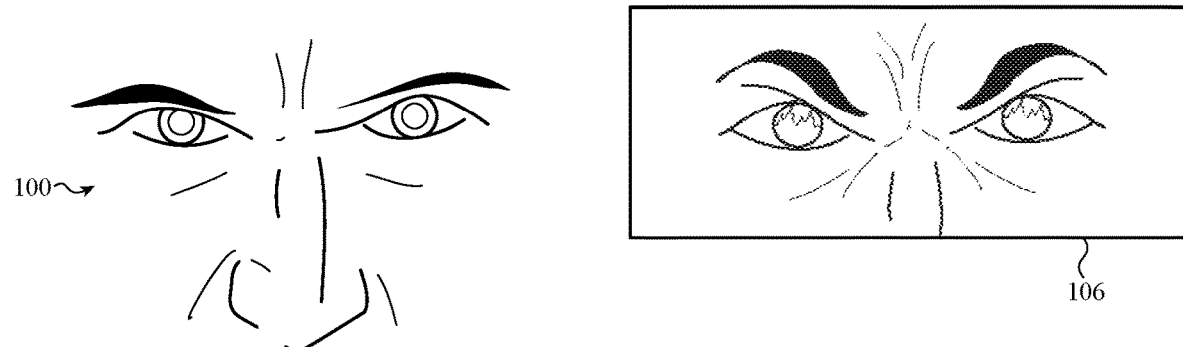

FIGS. 7A-7C show another example of a hybrid display technique. In particular, similar to FIGS. 6A-6C, some of a wearer's expressions or emotions cause the HMD 102 to display direct images of the wearer's face, while others cause the HMD 102 to display embellished or otherwise modified images representing the wearer's face. Whereas FIGS. 6B-6C show the wearer's face being replaced with cartoon eyes, FIGS. 7B-7C show the wearer's face having exaggerated versions of the wearer's real expression. For example, as shown in FIG. 7A, a resting or neutral expression may be displayed on the outward-facing display 106 as a real-time image of the wearer's face. As shown in FIG. 7B, when the wearer 100 has a surprised expression, which may be characterized by widening of the eyes and raising of the eyebrows, the HMD 102 may display the wearer's face but with eyes that are even wider and eyebrows that are even higher than those of the wearer's actual expression. Similarly, FIG. 7C shows the wearer 100 having an angry expression, characterized by narrowing of the eyes and lowering of the eyebrows. Detection of this expression or emotion (using any suitable detection technique, such as image analysis) may result in the HMD 102 displaying eyes having an exaggerated angry expression, including, for example, narrower eyes, more sharply angled eyebrows, and a flame or shimmering effect on the user's pupils.

The images in FIGS. 7B-7C may be still images, or they may be moving images that track, in real-time, the wearer's expressions (e.g., they may be manipulable digital models or real-time modifications of captured images of the wearer, as described above). Where they are still images, the they may be displayed for a predetermined duration (e.g., 1 second, 2 seconds, 3 seconds), or they may be displayed as long as the wearer has the expression (or as long as the wearer 100 commands them to be displayed). The images in 7B-7C may be produced by modifying captured images of the wearer. For example, the HMD 102 may identify regions of a captured image corresponding to particular facial features, such as eyebrows, pupils, iris, sclera, eyelids, forehead, and the like. Those regions (as well as surrounding or nearby areas of the image) may be modified to produce the desired image for display on the outward-facing display 106. For example, the angle of the eyebrows may be changed (e.g., producing or exaggerating a "V" shape) to exaggerate a detected expression of anger. As another example, the eyes and/or pupils may be enlarged to exaggerate an expression or surprise or excitement. As further examples, the borders of a pupil may be caused to shimmer or appear flame-like to exaggerate an expression of anger, or they may be changed to a heart-shape to exaggerate an expression of love. Other modifications are also possible.

Figure 8A:
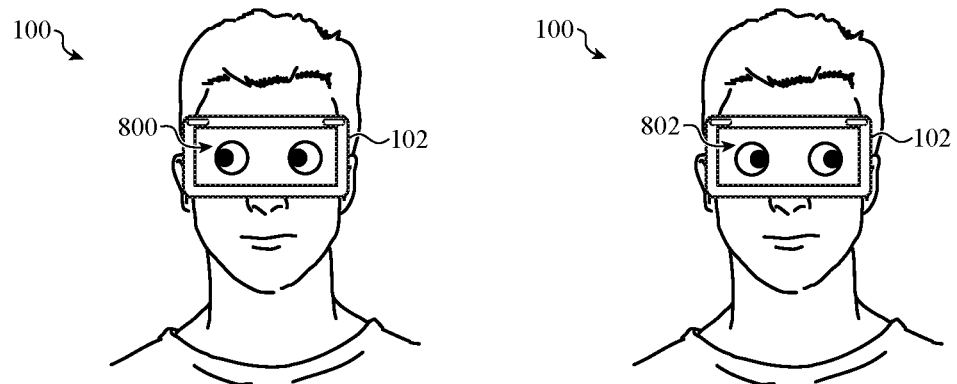
FIGS. 8A-8C depict example images, displayed on an outward-facing display, that are suggestive of a wearer's features.
Figure 8B:
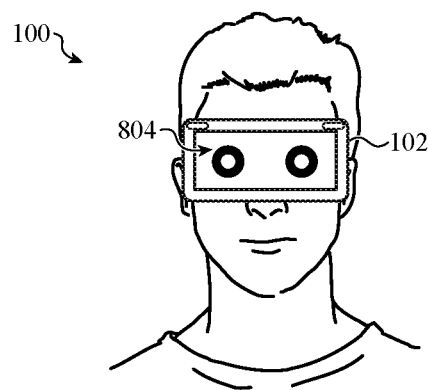
Figure 8C:
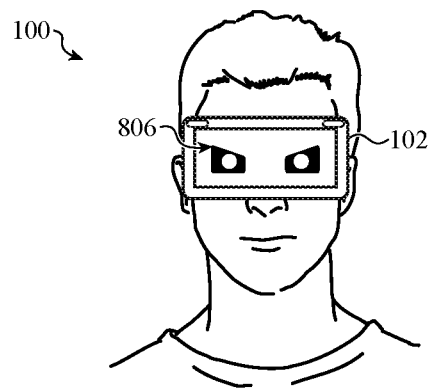

In some cases, what is displayed on the outward-facing display 106 may be more symbolic (e.g., less lifelike or realistic) than the images described with respect to FIGS. 4A-7C. For example, FIGS. 8A-8C show the HMD 102 displaying shapes that are representative or suggestive of eyes and that convey information, but that are not actually images of the human or animal eyes. Displaying shapes as shown in FIGS. 8A-8C may provide several benefits, such as lower screen resolution requirements, allowing greater anonymity for the wearer while also increasing the ability to interact and quality of interactions between the wearer and other people.

With reference to FIG. 8A, the HMD 102 may display shapes that represent the wearer's eyes and indicate, for example, where the wearer 100 is actually looking. The visual output 800 shows the wearer's gaze in one direction, while the visual output 802 shows the wearer's gaze in a different direction. Despite the highly obfuscated or symbolic appearance of the eyes, showing gaze direction may convey important information to observers and increase the feeling of interaction and connection between the wearer 100 and other people. As described herein, the wearer's gaze direction may be determined by sensors in the HMD 102.

FIG. 8B shows an example visual output 804 that may be used to indicate when the wearer 100 is directly focused on an observer or other person. As shown, the wearer's eyes may be represented by circles. This particular visual output 804 may also be used to indicate to observers that the wearer 100 is able to see the real world environment, rather than just a virtual world. The visual output on the outward-facing display 106 may change from one state to another based on any suitable information or status. For example, a gaze detection sensor or camera may detect the wearer's gaze and show the visual output 800, 802 when the wearer 100 is actively looking around the real-world environment, and show the visual output 804 when the wearer is focused on a single person or object in the real-world environment.

FIG. 8C shows an example visual output 806 that may be used to convey an emotion via shapes that represent eyes but are not images of the wearer's eyes. As shown, the conveyed emotion may be anger, though other shapes representing other emotions are also contemplated, such as hearts to indicate love, question marks to indicate confusion, oversized circles to indicate surprise, circles with teardrops to indicate sadness, and the like. Further, the emotion to be conveyed by the representative or symbolic eyes may be determined in any suitable way. For example, the wearer 100 may actively select what emotion is to be conveyed (e.g., by selecting from a list). As another example, the HMD 102 may use cameras, heart rate monitors, temperature sensors, skin-flush sensors, biometric sensors, or any other suitable technique, sensor, or system to determine the wearer's emotion for selecting a corresponding visual output.

In some cases, the outward-facing display 106 displays visual output that is not suggestive of eyes or other facial features, yet still conveys information to observers and increases the quality and the content of interactions between a wearer and an observer. Such visual outputs may include, for example, symbols or images indicative or suggestive of emotions or moods, informational displays (e.g., current weather, a description of the content the wearer is viewing, the wearer's calendar), or patterns that indicate operational states or a status of the wearer or the wearer's virtual environment. FIGS. 9A-9D show a wearer 100 with an HMD 102 displaying symbols, images, or other information that is not indicative of the wearer's eyes or face, yet still conveys information and increases the quality of interactions between the wearer and an observer.

Figure 9A:
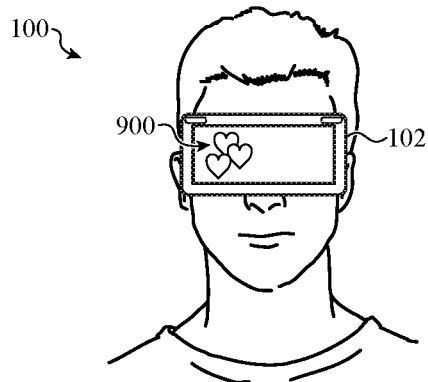
FIGS. 9A-9F depict example images, displayed on an outward-facing display, that are not suggestive of a wearer's features.

FIG. 9A, for example, shows the HMD 102 showing a visual output 900 that includes a pattern of hearts. The visual output 900 may be displayed in response to any suitable input or detected state of the wearer. For example, the visual output 900 may be displayed when the wearer 100 indicates (or the HMD 102 detects) that the wearer 100 is feeling happy or experiencing emotions of love or affection. The HMD 102 may detect such emotions in any suitable way, including facial image analysis, biometric sensors, or the like. As another example, the visual output 900 may be displayed when the wearer 100 indicates (or the HMD 102 detects) that a nearby observer is recognized (e.g., by comparison to a list of known individuals) and has been previously tagged as a family member or person for which the wearer feels affection. The displayed image of hearts is merely exemplary, and other images may be used to communicate affection (or any other emotion). For example, instead of hearts, the HMD 102 may display smiley faces, flowers, or the like.

Figure 9B:
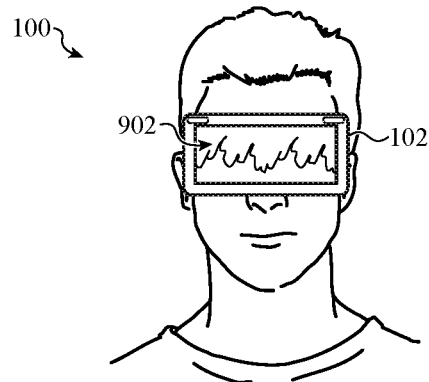

FIG. 9B shows the HMD 102 showing a visual output 902 that includes an image (e.g., a video or still image) of flames. Similar to the discussion of FIG. 9A, the visual output 902 may be displayed in response to any suitable input or detected state of the wearer, such as when the wearer 100 indicates (or the HMD 102 detects via facial image analysis, biometric sensors, etc.) that the wearer 100 is feeling angry. In other cases, the visual output 902 may show other images in response to detected or selected emotions of anger, such as lightning bolts, frowning faces, exclamation marks, "X" symbols, or the like.

FIGS. 9A and 9B show example visual outputs that may be presented to reflect or indicate the wearer's emotions or mental state (or to indicate an emotion that has been selected by the user, regardless of whether the user is actually experiencing a particular emotion or mood). Other emotions, moods, and mental states may also be detected by the HMD 102 and/or selected by the wearer 100, and corresponding visual outputs may be presented for those emotions, moods, or mental states. For example, question marks may be presented for confusion, tear drops may be presented for sadness, or the like.

Figure 9C:
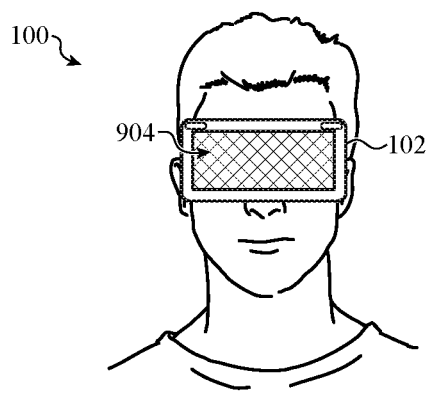

FIG. 9C shows an example visual output 904 that is an abstract image, such as a pattern. A pattern or other abstract image may be used to convey that a user does not wish to be disturbed, or merely as a default image for the HMD 102. In some cases, different patterns may be used to indicate different states or modes of the HMD 102 or conditions of the wearer. For example, a checkerboard pattern may indicate that the wearer does not want to be disturbed or is fully engaged in a virtual environment, while a pattern of circles or swirls may indicate that the wearer 100 is viewing the real-world environment or is open to interactions with outside observers. In some cases, patterns or other abstract images may become part of a de facto communication protocol or communication convention for outward-facing displays for HMDs. For example, as HMDs are increasingly used, people will become familiar with certain patterns and abstract images having certain meanings. Thus, even such abstracted images may increase the quality of interaction between wearers of HMDs and the outside world.

Figure 9D:
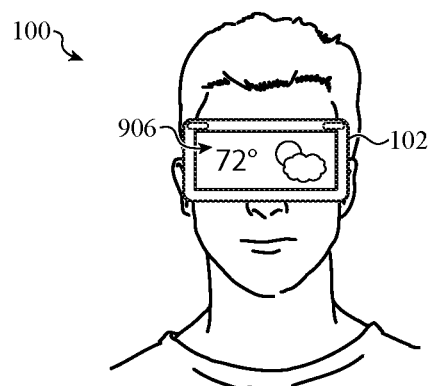

FIG. 9D shows an example an informational visual output 906. As shown, the visual output 906 shows weather information, though other information may be displayed in addition to or instead of weather information. Informational visual output 906 may be displayed when the HMD 102 in a particular state of operation (e.g., displaying a completely virtual environment to the wearer), or based on a particular environment or status of the wearer 100. For example, as described with respect to FIGS. 16A-16C, an HMD 102 may be configured to present different groups of visual outputs based on different environments or modes of the HMD 102 (e.g., "work," "home," or "public" modes etc.). An informational visual output 906, for example, may be presented on the outward-facing display when the wearer is in a "work" environment and is fully focused on a virtual environment.

Figure 9E:
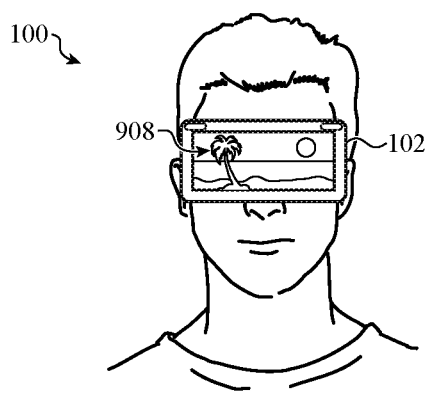

FIG. 9E shows an example visual output 908 that mirrors what is shown on the user-facing display(s) of the HMD 102. For example, if the user-facing display(s) of the HMD 102 are showing a virtual environment of a tropical beach scene, that same scene may be presented on the outward-facing display of the HMD 102. Displaying on the outward-facing display what the wearer is seeing may also increase the quality of interactions between a wearer and an observer, as the observer will gain additional insight into what the wearer is seeing. This additional contextual information can help the observer determine when and whether it is appropriate to interact with the wearer, what type of mood the wearer may be in, what type of work or leisure activity the wearer is engaged in, or the like. In some cases, the images displayed on user-facing displays may be configured to present stereoscopic images to produce a three-dimensional view for the wearer. In such cases, the HMD 102 may modify or alter the user-facing images so that they are viewable via a two-dimensional display. For example, stereoscopic images may be combined to produce a single image, or only one of the images used to form the stereoscopic image may be displayed.

Figure 9F:
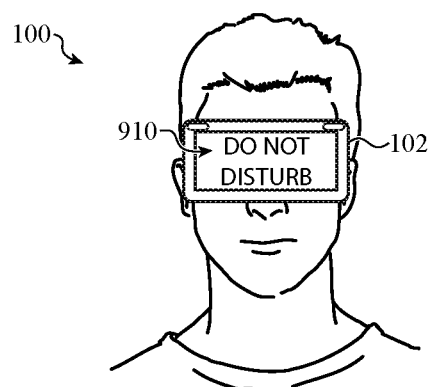

FIG. 9F shows an example visual output 910 that displays text. As shown, the displayed text includes the words "do not disturb," though any other message or text may be displayed. For example, the text may indicate that the wearer is fully immersed in a virtual environment (e.g., "please wait—I am in a virtual environment"), or that the wearer is currently viewing at least part of the real-world environment (e.g., "external view mode is active"). Any other suitable text relating to the wearer's state (e.g., mood, emotion), a mode or state of operation of the HMD 102, the type of environment being presented to the wearer (e.g., full virtual reality, augmented reality, mixed reality), or the like, may be presented on the outward-facing display 106.

FIGS. 10A-10D show examples of symbolic visual outputs that convey information about the wearer 100 and/or the wearer's state of interaction with virtual and real-world environments. The visual outputs shown in FIGS. 10A-10D may be part of a communication convention for outward-facing displays to convey a set of concepts that may help improve interactions between the wearer 100 and external observers. In particular, the visual outputs shown in these figures may be intended to convey that the wearer 100 is engaged in the virtual world (and thus is not aware of real-world surroundings), that the wearer 100 does not wish to be disturbed or to interact with external observers, that the user is focused on or is able to see the real-world environment, and/or that the wearer 100 is currently recording video of the real-world environment.

Figure 10A:
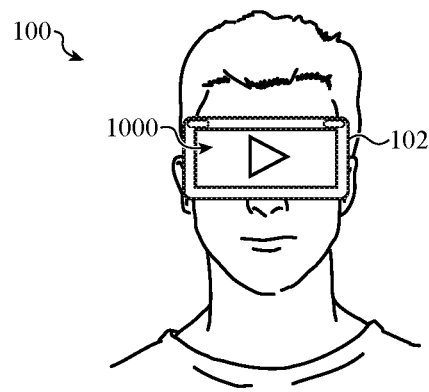
FIGS. 10A-10D depict example images, displayed on an outward-facing display, that convey a mode of an HMD or a wearer.
Figure 10B:
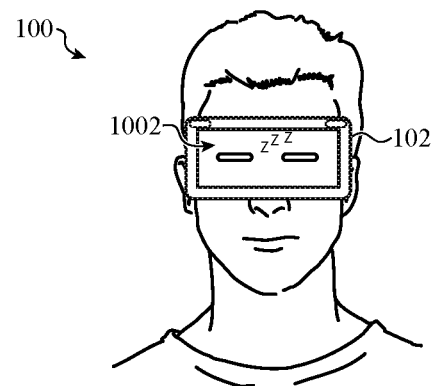
Figure 10C:
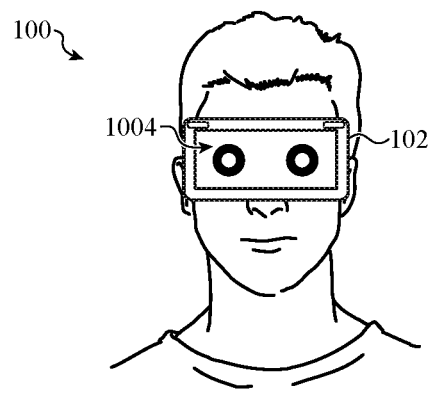
Figure 10D:
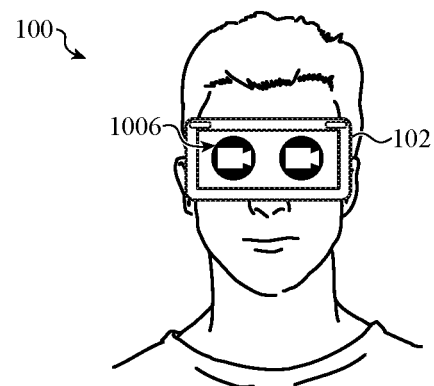

For example, FIG. 10A shows the HMD 102 displaying a visual output 1000 of a triangle, which may resemble a "playback" symbol. This visual output may indicate that the wearer 100 is fully engaged in a virtual environment and/or that the real-world environment is not being presented to the wearer. FIG. 10B shows the HMD 102 displaying a visual output 1002 with two lines or shapes that are suggestive of closed eyes. The visual output 1002 may convey that the HMD 102 is in a "do not disturb" state or the wearer 100 otherwise does not wish to be interrupted or engage with the real-world environment. FIG. 10C shows the HMD 102 displaying circles that are suggestive of open eyes (similar to the visual output 804, described above), indicating that the wearer 100 is viewing the real-world environment and/or is open to engage with individuals in the real-world environment. FIG. 10D shows the HMD 102 displaying a visual output 1006 of circles with inset icons or symbols representing video cameras, indicating to outside observers that the HMD 102 is recording images (e.g., video or still images) of the real-world environment. Other symbols or colors may instead be used to convey that the HMD 102 is recording, such as red circles or red circles with a contrasting peripheral border.

As described herein, an outward-facing display may have a resolution capable of displaying actual images, similar to a display of a smartphone or a computer monitor. In some cases, an outward facing display may be a low-resolution display, such as an array of light emitting diodes (LEDs). In such cases, the HMD 102 may use the array to produce shapes and patterns of lights to convey information to increase the quality of interactions between the wearer 100 and outside observers.

Figure 11A:
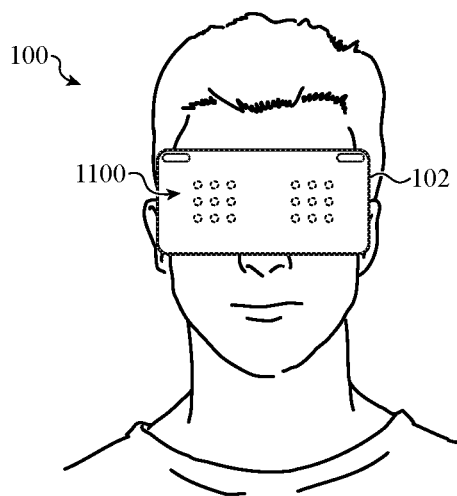
FIGS. 11A-11D depict example visual outputs of an outwardly visible light array.

For example, FIG. 11A shows the HMD 102 with light arrays 1100 that each include nine light sources arranged in a pattern. (Amounts and patterns of light sources other than those shown in FIG. 11A may also be used.) The light sources in the light arrays 1100 may be LEDs, incandescent light sources, or any other suitable light source.

Figure 11B:
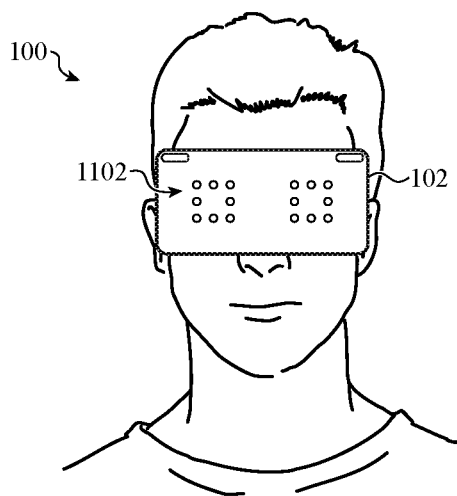
Figure 11C:
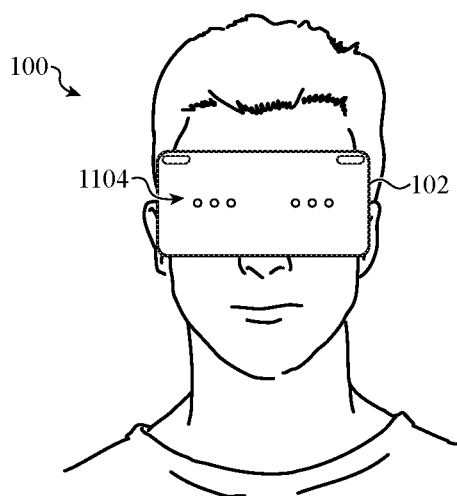
Figure 11D:
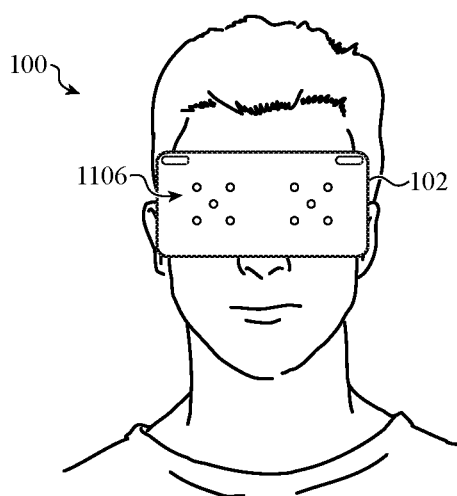

FIG. 11B shows the light arrays 1100 displaying a visual output 1102 suggestive of open eyes. This pattern may be displayed when the wearer 100 is viewing or is able to view the real-world environment and/or is willing to engage with others. FIG. 11C shows the light arrays 1100 displaying a visual output 1104 suggestive of closed eyes, which may be may displayed when the HMD 102 is in a "do not disturb" state or the wearer 100 otherwise does not wish to be interrupted or engage with the real-world environment. FIG. 11D shows the light arrays 1100 displaying a visual output 1106 having the shape of two "X" symbols, which may indicate that the wearer 100 is fully engaged in a virtual environment and/or that the real-world environment is not being presented to the wearer.

Other patterns indicative of other states of the HMD 102 or the wearer 100 may also be displayed using the light arrays 1100. For example, the light arrays 1100 may display patterns that suggest the emotion or mood of the wearer, such as patterns resembling or suggesting the shape of a smile or frown to indicate happiness or sadness. As another example, the light arrays 1100 may be operated as a scrolling marquee to display text output. The patterns shown on the light arrays 1100 may be or become part of a communication convention, where large groups of people become familiar with a set of common patterns and their meanings. In this way, the patterns may become well accepted and understood ways to convey information between wearers of HMDs and external observers.

FIGS. 12A-12F show additional examples of how a level of engagement of a wearer with the real-world environment may be conveyed using different types of visual outputs on an outward-facing display 106. For example, the particular visual output that is displayed on an outward-facing display may be indicative or suggestive of, for example, what the wearer is viewing, the level of virtualization and/or immersion of the wearer's environment, or the like.

Figure 12A:
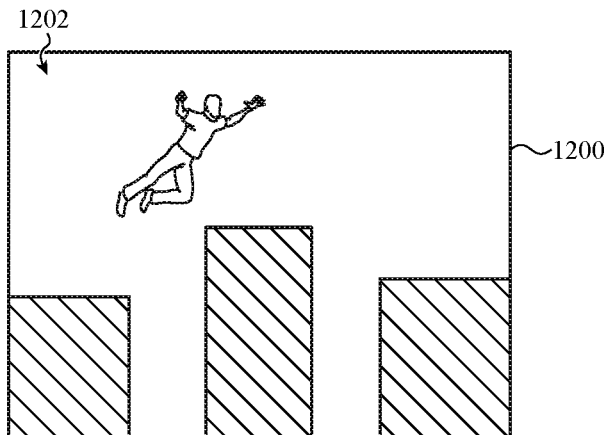
FIGS. 12A-12F depict example visual outputs that correspond to and/or indicate the level of engagement of a wearer with the real-world environment.
Figure 12B:
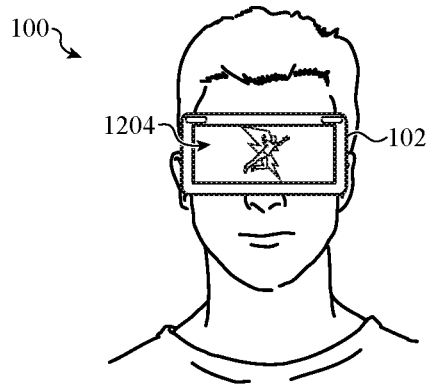

With reference to FIGS. 12A and 12B, when a wearer is fully engaged in a virtual environment 1202, such as a video game (as shown in FIG. 12A) or a movie or video, the outward-facing display may show a visual output 1204 including logo or title (as shown in FIG. 12B) that conveys information about what the wearer is engaged with, as well as conveying the fact that the wearer is fully engaged with the virtual environment (and thus may not be aware of the real-world environment). While FIG. 12B shows a logo representative of the video game, other symbolic outputs representative of the content being displayed to the wearer may be displayed, including text (such as a movie title), stylized text, an image of a character in a movie, a movie poster or other promotional images, etc.

Figure 12C:
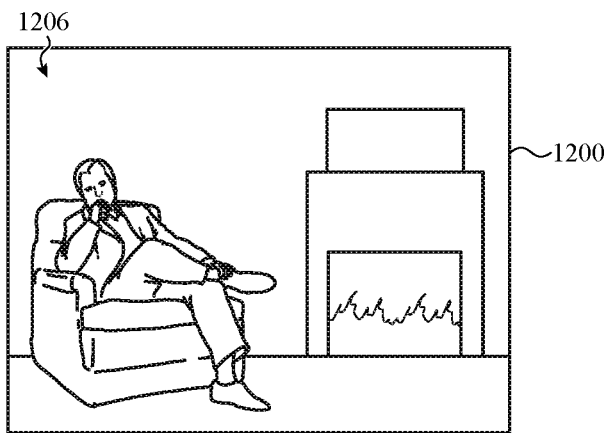
Figure 12D:
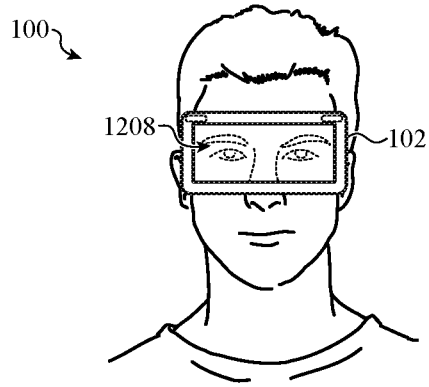

The HMD 102 may display a different visual output when the HMD 102 is operating in a pass-through or "full reality" mode, such as when the HMD 102 is showing images of the real-world environment to the wearer 100. For example, FIG. 12C shows an example internal image 1206 corresponding to a live or real-time image of the real-world environment around the wearer 100. When the wearer 100 is viewing the image of the real-world environment as shown in FIG. 12C, the HMD 102 may display a visual output 1208 of the wearer's eyes (e.g., images of the wearer's actual eyes, as described above), as shown in FIG. 12D. Thus, the direct view of the wearer's eyes indicates to outside observers that the wearer is also directly viewing the real-world environment. The real-time, un-virtualized, two-way display of real images on both the inward- and outward-facing displays may enhance the quality of interactions by minimizing the effect of the HMD 102 and allowing a more natural interaction and communication style. Moreover, the fact that the image on the outward-facing display is not virtualized may suggest to observers that the wearer's internal view is also not a virtual- or mixed-reality environment.

Figure 12E:
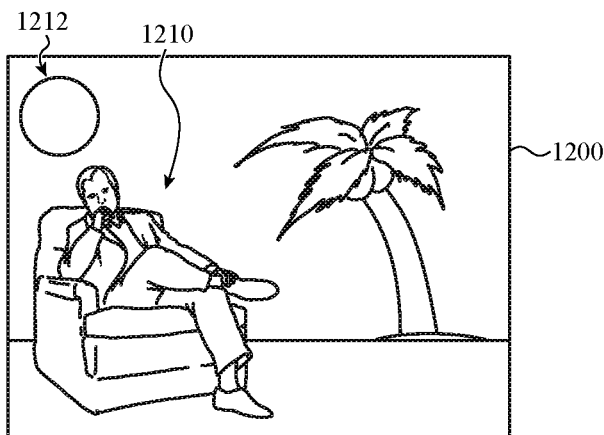
Figure 12F:
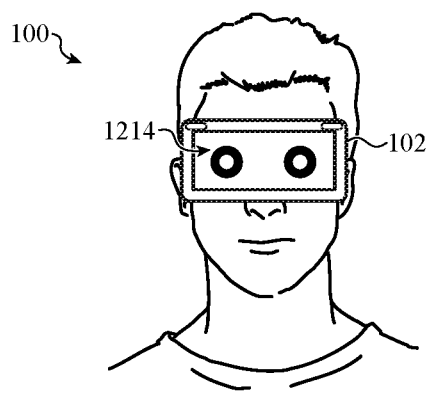

The HMD 102 may display yet another visual output when the HMD 102 is operating in a mixed reality or augmented reality mode, as illustrated in FIGS. 12E-12F. For example, FIG. 12E shows an example mixed reality visual output 1212 (displayed to the wearer 100) in which a real-world element 1210 (e.g., a person) is incorporated into a virtual environment. In order to convey to observers that the wearer 100 can see them or some other aspect of the real-world environment, the HMD 102 may display, on the outward-facing display, the wearer's eyes embellished with an additional symbol or indicator that the wearer's view is somehow modified or mediated. For example, as shown in FIG. 12F, a visual output 1214 may include real-time images of part of the wearer's face with circles around the eyes. Increasing the amount of information that observers have about what the wearer is viewing may help to ease awkwardness and generally increase the comfort level of outside observers, as observers may feel more comfortable knowing when and whether the wearer is being exposed to content in addition to the real-world environment.

While many of the examples herein use graphical displays (e.g., either high or low resolution displays capable of producing symbolic graphical or visual output) to display images or shapes to convey information about the state of a wearer's engagement with the real-world environment, information may also be conveyed using other visual outputs. For example, one or more light source associated with (e.g., attached to) an HMD may shine red when the HMD 102 is in a virtual reality mode, yellow when the wearer is in a mixed or augmented reality mode, and green when the wearer is in a pass-through mode. As another example, a light source may shine red when the wearer 100 is angry or otherwise in a bad mood, and green when the wearer 100 is happy or otherwise in a good mood. Other techniques for visually conveying the state of the wearer's real-world engagement, mood, emotional state, or any other suitable information, are also possible.

Figure 13A:
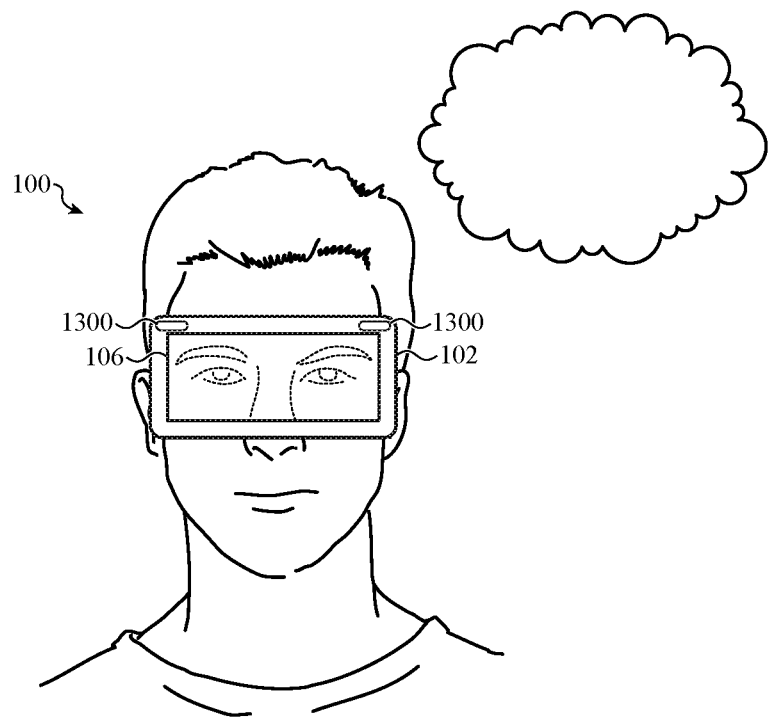
FIGS. 13A-14D depict example modified images displayed on an outward-facing display, incorporating aspects of the real world environment.
Figure 13B:
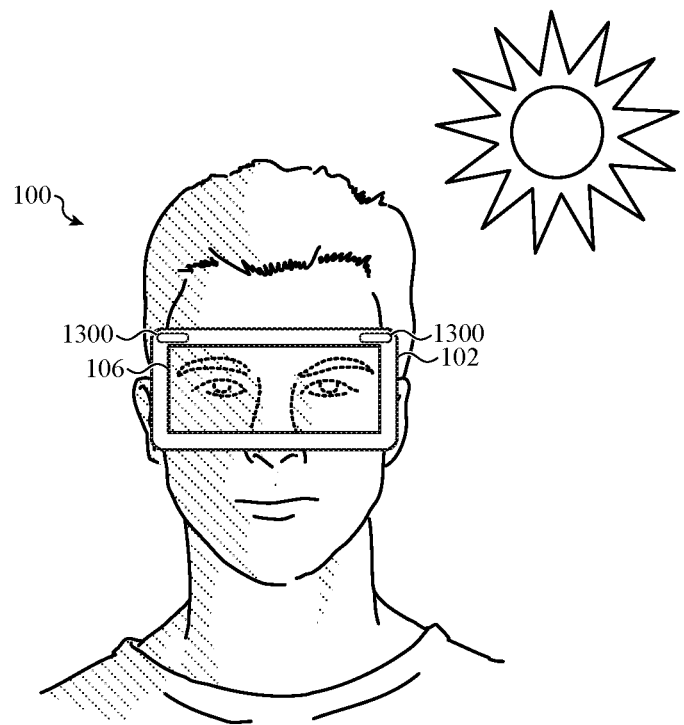

As described herein, where an HMD 102 captures images of the wearer 100 to display on an outward-facing display (as described with reference to FIGS. 4A-4C and 7A-7C, for example), the captured images may also or instead be modified, at least in part, based on aspects of the surrounding real world environment. For example, FIGS. 13A-13B show how the HMD 102 may modify captured images based at least partially on the lighting conditions of the real world environment. FIG. 13A shows the wearer 100 wearing the HMD 102 in diffuse lighting conditions, such as may occur on a cloudy day or in an environment with substantially omnidirectional lighting (e.g., where substantially no shadows are cast on the wearer's face). The HMD 102 may use sensors 1300 (e.g., photosensors, cameras) to determine an intensity, color, or primary direction (and/or other properties) of the ambient light, and may modify captured images in view of those properties to produce an image for display that substantially matches the uncovered portion of the wearer's face. FIG. 13A illustrates how the image on the outward-facing display 106 may substantially match the lighting, shading, color, and overall look of the uncovered portion of the wearer's face.

FIG. 13B shows the wearer 100 wearing the HMD 102 in an environment with a highly directional light source. FIG. 13B represents this environment as a sunny day, but such lighting conditions may be produced in many ways, such as by indoor lights. Such lighting conditions may cast shadows on parts of the wearer's face. Accordingly, in order to produce a more natural image on the outward-facing display 106, the HMD 102 may use sensors 1300 (e.g., photosensors, cameras, or the like) to determine an intensity, color, and/or primary direction (as well as other properties) of the ambient light, and may modify captured images to add shadows, highlights, and other lighting (or other) modifications to the displayed image. Accordingly, as shown in FIG. 13B, the image of the wearer's face displayed on the outward-facing display 106 substantially matches and blends with the uncovered portion of the wearer's face, producing a natural appearance.

The HMD 102 may manipulate a displayed image based on the external environment in other ways as well. For example, as described with respect to FIGS. 14A-14D, the HMD 102 may modify how an image is displayed on the outward-facing display 106 based on where an observer 1400 is relative to the wearer 100. In particular, the HMD 102 may detect the location or position of the observer 1400 relative to the wearer 100 (and/or relative to the direction that the HMD 102 is facing), and may alter the image so that the displayed portion of the wearer's face appears to follow the contours of the wearer's face (e.g., instead of appearing a few inches in front of the wearer's face due to the positioning of the outward-facing display 106). The HMD 102 may determine the position of the observer 1400 relative to the wearer 100 (and/or relative to the direction or orientation of the HMD 102) in any suitable way and using any suitable sensors, such as LIDAR, radar, ultrasonic sensors, cameras, accelerometers, or any other suitable sensor.

Figure 14A:
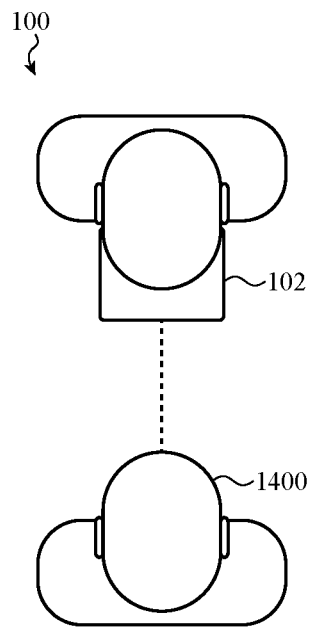
Figure 14B:
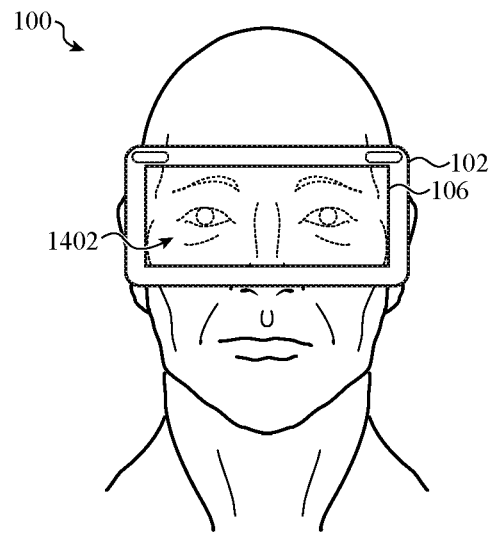
Figure 14C:
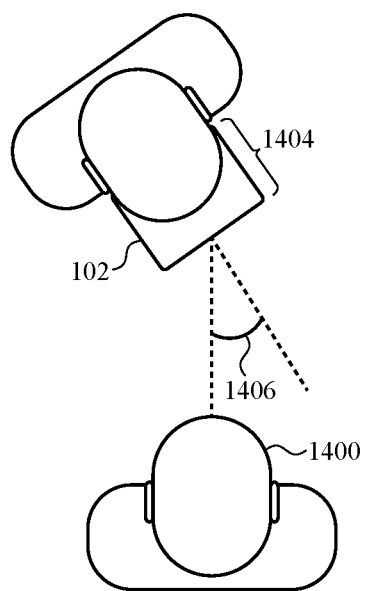

FIG. 14B shows how an image may be displayed on the outward-facing display 106 when the wearer 100 is directly in front of the observer 1400 (e.g., where the viewing angle of the observer relative to the HMD 102 is about 0 degrees), as shown in FIG. 14A. In particular, as shown in FIG. 14B, an image 1402 is presented on the outward-facing display 106 so that the image 1402 blends with an exposed portion of the wearer's face. Under these viewing conditions (e.g., a 0 degree or head-on viewing angle), the HMD 102 may not need to manipulate a captured image to accommodate for the viewing angle. In particular, the image of the wearer's face that is captured by the HMD 102 may be from a straight-on viewing angle, and thus angle adjustments may not be necessary. In some cases, the HMD 102 may change the size of the captured image prior to displaying the image 1402 on the outward-facing display 106 so that the displayed facial features are aligned with the wearer's actual facial features and correctly positioned (e.g., so that the displayed eyes do not appear larger or smaller than, or out of place relative to, the wearer's actual eyes).

Figure 14D:
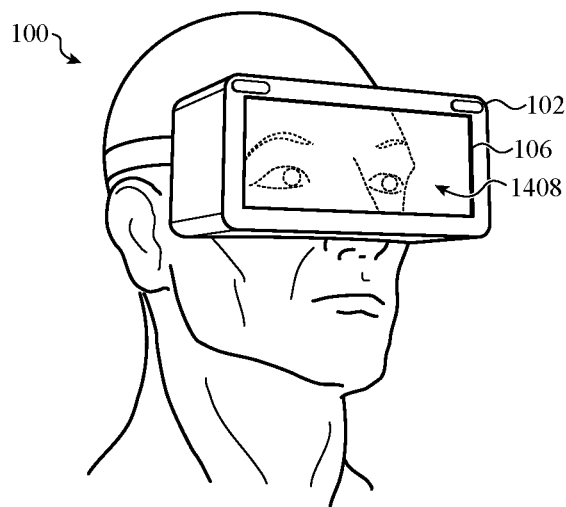

FIG. 14D shows how an image may be displayed on the outward-facing display 106 when the observer 1400 is viewing the outward-facing display 106 at an angle 1406. As noted above, the HMD 102 may determine the viewing angle of the observer 1400 relative to the outward-facing display 106 using LIDAR, radar, ultrasonic sensors, cameras, accelerometers, and/or any other suitable sensing systems. Once the viewing angle is determined, the HMD 102 may process a captured image of the wearer's face based on the viewing angle to produce a modified image 1408 for display on the outward-facing display 106. The modified image 1408 may be skewed, stretched, rotated, or otherwise manipulated to produce the illusion that the outward-facing display 106 is transparent and that the observer 1400 is actually viewing the wearer's face through the HMD 102. If the image 1408 is not manipulated in this way, the parallax effect of displaying the wearer's eyes on the front of the HMD 102 may produce a distracting, unnatural appearance. The HMD 102 may periodically update the viewing angle of the observer 1400 relative to the outward-facing display 106 and update the modified image 1408 in accordance with the updated positional information, thus providing real-time positional tracking and image updating, further increasing the natural experience and appearance for the observer 1400.

Figure 15A:
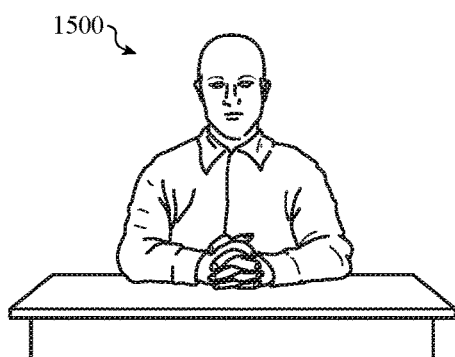
FIGS. 15A-15D depict example images displayed on a wearer-facing display, based on captured images of the real world environment.
Figure 15B:
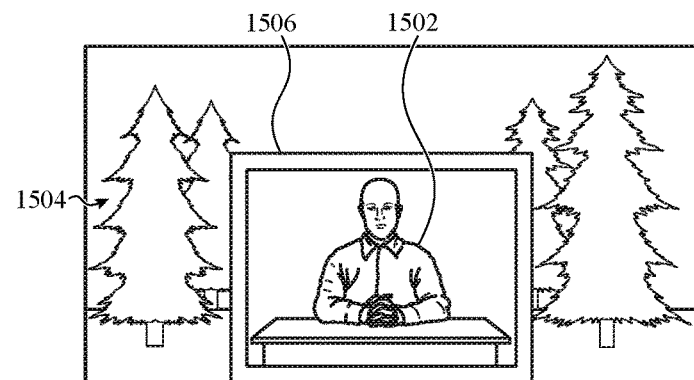
Figure 15C:
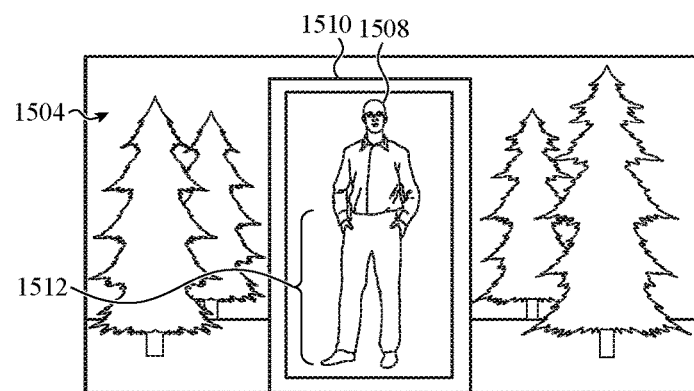
Figure 15D:
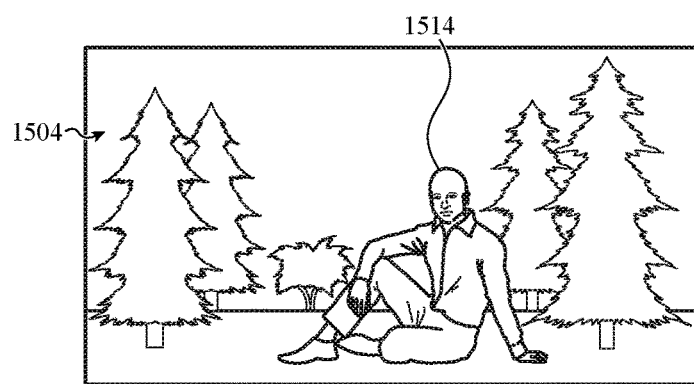

The HMD 102 may also be configured to integrate aspects of the external, real world environment into the virtual environment being presented to the wearer. FIGS. 15A-15D show examples of various ways in which images of the real world environment, and in particular a person in the real world environment, may be integrated into the virtual environment presented to the wearer 100 by the HMD 102. For example, FIG. 15A shows a person 1500 with whom a wearer of the HMD 102 is interacting, and FIGS. 15B-15D show examples of a virtual environment 1504 being presented to the wearer.

At the outset, the HMD 102 may capture an image of the person 1500 using a camera or other sensor or imaging device. As shown in FIG. 15B, the HMD 102 may present the captured image as a live video feed 1502 in the virtual environment 1504. The live video feed 1502 may be displayed in a discrete window 1506 that overlays the virtual environment 1504 and that may visually distinguish the video feed 1502 from the displayed virtual environment 1504. The live video feed 1502 may be movable and/or resizable within the virtual environment 1504 by the wearer. For example, the HMD 102 may allow the wearer to move the video feed 1502 to a less distracting location or size, such as in a corner of the virtual environment 1504, thus allowing the wearer to customize the level to which he or she is interacting with each of the virtual environment and the real world environment.

In some cases, the HMD 102 may modify the image captured of the person 1500. For example, the HMD 102 may add features or aspects of the person 1500 that are not present in the captured image. For example, as shown in FIG. 15C, the HMD 102 may capture an image of only part of the person's 1500 body (e.g., the person's head and torso) and integrate that part with a lower half 1512 of the person's body to produce an image 1508 corresponding to the person 1500. The integration of the captured image with the additional content may be performed in real-time or near real-time, so that the displayed image 1508 appears as a live, real-time video feed. Other aspects of the captured image may remain unchanged, such as the background behind the person 1500, and the background may remain distinct from the virtual environment 1504 to maintain a visual separation between the virtual environment 1504 and the image 1508 of the real world environment.

The additional body portions (or other content that is integrated with the captured image) may be integrated with the captured image of the person 1500 in any suitable way. For example, the HMD 102 may store or receive pre-captured or pre-rendered images (either still or video images) to which captured images or portions thereof may be added, superimposed, or otherwise blended to produce the image 1508. The image 1508 may be displayed in a discrete window 1510, as described above.

In some cases, the HMD 102 may more fully integrate the image of the person 1500 into the virtual environment 1504. For example, instead of displaying a live video feed (FIG. 15B) or a modified live video feed (FIG. 15C), the HMD 102 may partially or fully virtualize the person 1500 and integrate the virtualized image into the virtual environment 1504. For example, the HMD 102 may extract information about the person 1500 from the captured image, such as the user's facial features, movements, gaze direction, eye motions, expressions, or the like. The HMD 102 may then use this information to control a manipulable model of a person, animal, or other virtual object that can be integrated in the virtual environment. This technique may allow the person 1500 to appear as various different people or creatures. In one particular example, if a wearer is playing a video game in which the characters are fantastical creatures, such as elves and wizards, a person 1500 in the real world can be virtualized as an elf. In this way, the wearer can interact with the virtualized person within the context of the video game and while maintaining immersion in the virtual world, and people in the real world environment are afforded a more natural, unmediated communication experience with the wearer.

While the HMD can display many different types of information and images on an outward-facing display, not all information or images will necessarily be suitable or appropriate for all situations in which an HMD may be worn. For example, when a wearer is at home and is "internally focused" (e.g., engaged with a virtual environment), it may be acceptable for the outward-facing display to mirror what the wearer is seeing in the HMD. At work, where confidentiality of working documents or other materials may be important, it may not be suitable to mirror the inward-facing displays as a default setting. Accordingly, the HMD 102 may have different modes in which different types of visual outputs are displayed for different statuses of the wearer or HMD. For example, FIGS. 16A-16C show three example modes (home, work, and public) and what may be displayed on an outward-facing display in each mode for three example statuses (internal focus, external engagement, and do not disturb).

Figure 16A:
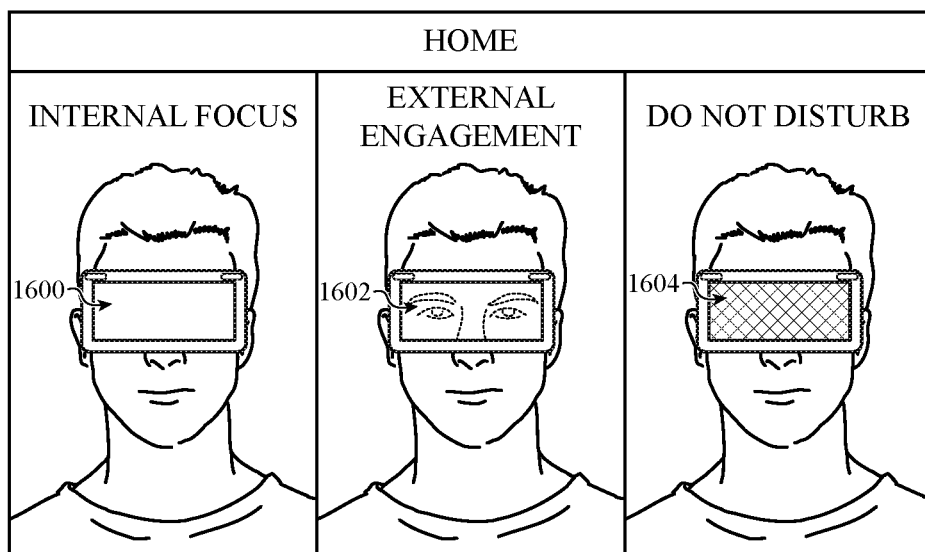
FIGS. 16A-16C depict example mappings between visual outputs and modes of operation of an HMD.

FIG. 16A shows the types of content that may be presented on an outward-facing display when a user is in a "home" mode. The particular mode of the HMD may be selected or determined in any suitable way. For example, a wearer may select a mode manually, or the HMD may determine a mode automatically, for example, using a location of the HMD, a date/time, a calendar entry associated with the wearer, a set of present conditions established by the wearer, available communications networks, or the like.

When the HMD is in a "home" mode and the wearer is internally focused, the outward-facing display may show a visual output 1600 that mirrors the wearer's virtual or internal environment (as represented in output 1600 by a gameplay scene). When the wearer is in the "home" mode and externally focused, the display may show a visual output 1602 including images of the wearer's actual eyes. When the wearer is in the "home" mode and is in a "do not disturb" condition, the display may show a visual output 1604 of a pattern, such as a checkerboard or screen pattern. These or other suitable visual outputs for the "home" mode may reflect the more open and laid-back atmosphere that wearers may encounter when at their home.

Figure 16B:
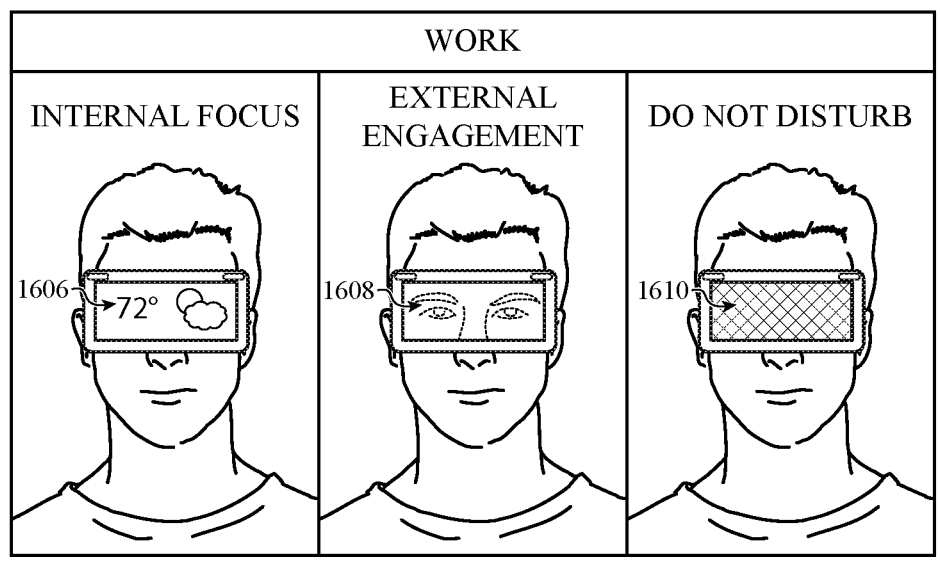
Figure 16C:
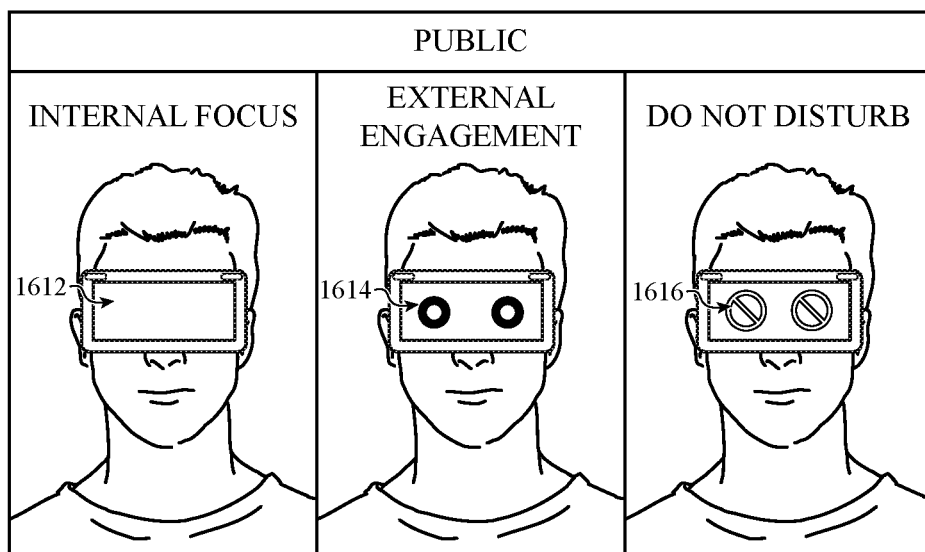

As shown in FIG. 16B, when the HMD is in a "work" mode and the wearer is internally focused, the outward-facing display may show a visual output 1606 that includes information (e.g., the weather, the wearer's upcoming appointments or open appointment slots, etc.), but does not mirrors the wearer's virtual or internal environment. This may help maintain confidentiality while also providing useful information to coworkers or other observers. When the wearer is in the "work" mode and externally focused, the display may show a visual output 1608 including images of the wearer's actual eyes, which may be useful in work environments when personal recognition is helpful and virtualized images may be inappropriate. When the wearer is in the "work" mode and is in a "do not disturb" condition, the display may show a visual output 1610 that includes direct words such as "do not disturb." These or other suitable visual outputs for the "work" mode may reflect the more professional atmosphere that wearers may encounter when at their work.

FIG. 16C shows the types of content that may be presented on an outward-facing display when a user is in a "public" mode, such as when a wearer is in a public place or otherwise may wish to share less information about themselves or their virtual environment. For example, when the HMD is in a "public" mode and the wearer is internally focused, the outward-facing display may show a visual output 1612 that is blank (e.g., no discernable visual output or a deactivated display). When the wearer is in the "public" mode and externally focused, the display may show a visual output 1614 including digital representations of eyes. This type of visual output may indicate to others that the wearer can perceive them and/or the environment, while also hiding more personal details of the wearer such as the wearer's actual appearance, gaze direction, facial expressions, and the like. When the wearer is in the "public" mode and is in a "do not disturb" condition, the display may show a visual output 1616 that includes images or symbols that quickly and indicate that the user does not wish to be disturbed, such as a "prohibition sign."

The modes, statuses, and corresponding types of visual outputs shown and described with respect to FIGS. 16A-16C are merely examples. More or fewer modes may be used, and each mode may have more or fewer statuses associated therewith. Further, statuses may be related to a wearer's mood or emotional state rather than level of engagement with the real-world environment, and other types of information or visual outputs may be used for any given status.

Figure 17A:
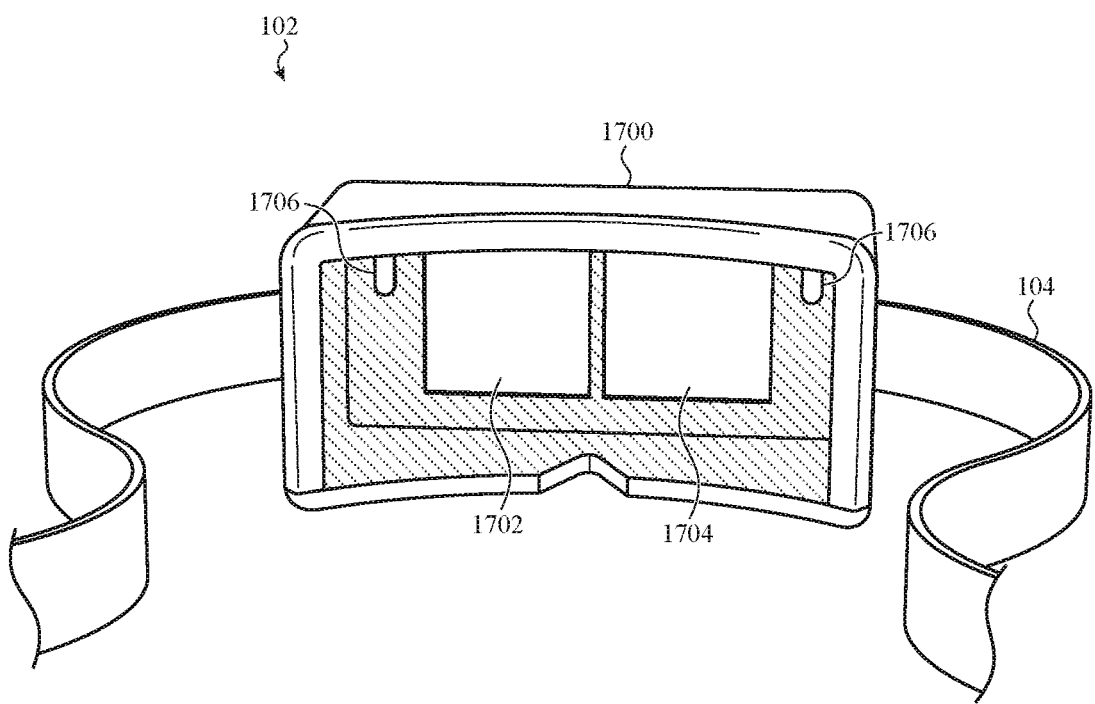
FIGS. 17A-17B depict an example HMD.
Figure 17B:
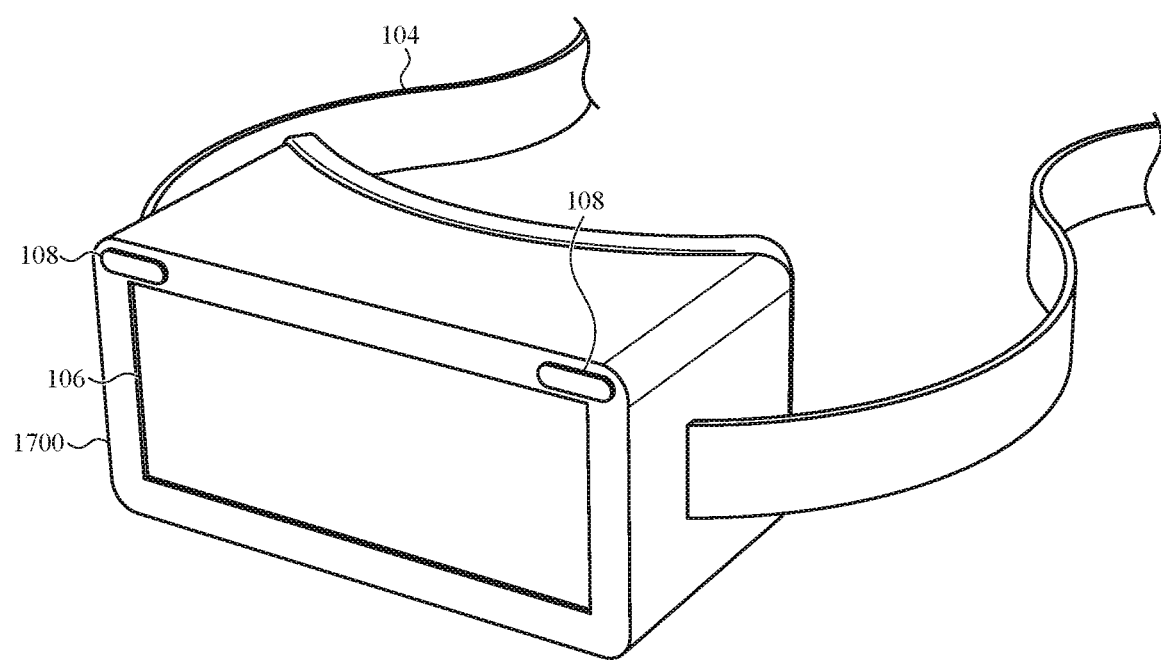

FIGS. 17A-17B show details of the physical structure and components of the HMD 102. The components shown in these figures are merely examples of components and configurations that may be used, and are meant more to illustrate the functions of the various components rather than any particular shape, location, size, integration, or other physical characteristic of the components.

FIG. 17A shows a back or internal view of the HMD 102. The HMD 102 includes a housing 1700 that covers at least a wearer's eyes, and possibly other portions of the wearer's face. A strap 104 may be coupled to the housing 1700 to attach the HMD 102 to a wearer's head.

The HMD 102 includes user-facing displays 1702, 1704 that present visual information to the wearer. The user-facing displays 1702, 1704 may be flat or curved display panels (e.g., LED or OLED screens) on which an at least partially virtual environment may be displayed. While shown as two separate components, the user-facing displays 1702, 1704 may be a single component on which two different (though related) images may be presented. The different images may be configured to simulate a three-dimensional environment for the wearer. The HMD 102 may also include lenses or other optical components in front of the user-facing displays 1702, 1704 (e.g., between the displays and the wearer's eyes) to provide optical characteristics that result in the simulation of a three-dimensional environment. While the use-facing displays 1702, 1704 are shown as flat screens, other types of displays may be used instead or in addition to the flat screens, such as retinal projectors, optical collimators (similar to a heads-up-display), or the like.

Further, the user-facing displays 1702, 1704 may be integrated with the HMD 102 in any suitable way. For example, the user-facing displays 1702, 1704 may be one or more integral components that are built into a housing of the HMD 102. As another example, the user-facing displays 1702, 1704 may be one or more removable components that can be attached to and/or removed from the HMD 102 by a consumer. In the latter example, the user-facing displays 1702, 1704 may be a display accessory (e.g., an accessory that is intended only as an add-on component to the HMD 102), or they may be an electronic device that provides its own separate functionality (e.g., a smartphone or tablet or other suitable device that can be attached and/or connected to the HMD 102). Where the user-facing displays 1702, 1704 are a single component and/or include only a single, contiguous display, the display may be operated to produce two distinct visual outputs. For example, a single display may produce a first visual output to be presented to one eye, and a second visual output to be presented to another eye.

The HMD 102 may also include wearer-facing sensor arrays 1706. The wearer-facing sensor arrays 1706 may include cameras, eye-tracking sensors, biometric sensors (e.g., heart rate, blood oxygen, respiration rate, perspiration rate), optical sensors, motion sensors, presence sensors (e.g., to detect whether the HMD 102 is currently being worn), or the like. For example, the wearer-facing sensor arrays 1706 may include a wearer-facing camera to capture images of the wearer to be displayed (either modified or unmodified) on an outward-facing display 106 (FIG. 1) of the HMD 102, an eye tracking sensor to detect eye movements and gaze direction, and a motion tracking sensor to detect facial movements. More or fewer sensors may be included in the sensor arrays 1706.

FIG. 17B shows a front or exterior view of the HMD 102. As described in detail herein, the HMD 102 includes an outward-facing display 106 positioned within the housing 1700. The outward-facing display 106 may be any suitable type of display, including a liquid-crystal display (LCD), organic light emitting diode (OLED) display, LED display, or the like. The outward-facing display 106 may be configured to display the images or videos described herein, thus providing a more interactive and natural communication experience between a wearer and individuals in the real-world environment. The outward-facing display 106 may be a display other than a binary indicator, such as a light that indicates whether the device is on or off.

The outward-facing display 106 may be integrated with the HMD 102 in any suitable way. For example, the outward-facing display 106 may be an integral component that is built in to a housing of the HMD 102. As another example, the outward-facing display 106 may be a removable component that can be attached to and/or removed from the HMD 102 by a consumer. In the latter example, the outward-facing display 106 may be a display accessory (e.g., an accessory that is intended only as an add-on component to the HMD 102), or it may be an electronic device that provides its own separate functionality (e.g., a smartphone or tablet or other suitable device that can be attached and/or connected to the HMD 102). The outward-facing display 106 may be a high-resolution display that is capable of rendering realistic images, or a low-resolution display that is not capable of rendering realistic images (e.g., photographs), but is capable of rendering non-realistic symbolic graphical outputs (e.g., patterns and shapes). The outward-facing display 106 may also be covered by a protective cover, such as a glass, plastic, polycarbonate, sapphire, or other transparent material.

Also, while the outward-facing display 106 is often shown and described herein as a single display component, it may include multiple different displays, such as two or more displays in a side-by-side arrangement, or two or more displays in an over-under arrangement. For example, an over-under arrangement of outward-facing displays may include one display extending horizontally from a first side to a second side of the HMD 102 (which may roughly correspond to the location of a wearer's eyebrows), and a second display below the first display and extending horizontally from the first to the second side of the HMD 102 (which may roughly correspond to the location of the wearer's eyes). The first and second displays may display different subject matter. For example, the second display may present images of the wearer's eyes, while the first display may present textual information, such as a description of the wearer's virtual environment, a mode of operation of the HMD 102, a preference of the wearer (e.g., do not disturb, open to interaction, etc.), or other information such as stock values, weather information, calendar information, etc.

The HMD 102 may also include outward-facing sensor arrays 108. The outward-facing sensor arrays 108 may include sensors that capture information about the real-world environment with which to improve the experience of using the HMD 102 for both the wearer and observers. For example, the outward-facing sensor arrays 108 may include an outward-facing camera that captures images of people that are then displayed (with or without modification) to a wearer, thereby allowing the wearer to perceive the real-world environment without removing the HMD 102. The outward-facing sensor arrays 108 may also include object detection sensors, such as LIDAR, radar, or ultrasonic sensors, that can be used to determine the viewing angle of an observer with respect to the outward-facing display 106. As described, the HMD 102 may use this information to produce images that seamlessly blend with the wearer's physical features, thus providing a more natural appearance of the wearer to an observer. Other sensors included in the outward-facing sensor arrays 108 may include, for example, photo sensors (e.g., for sensing color and directionality of ambient light), motion-tracking or motion-capture sensors (e.g., for sensing the movements of observers for applying to manipulable models or avatars in a virtual environment), and the like.

Figure 18A:
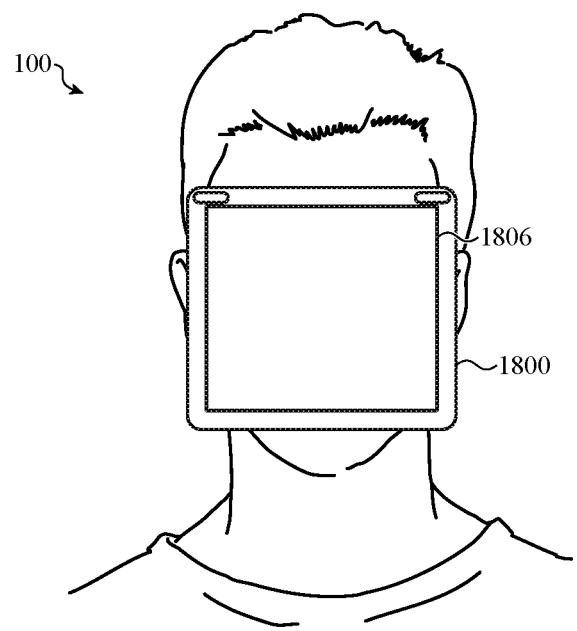
FIGS. 18A-18B depict another example HMD.
Figure 18B:
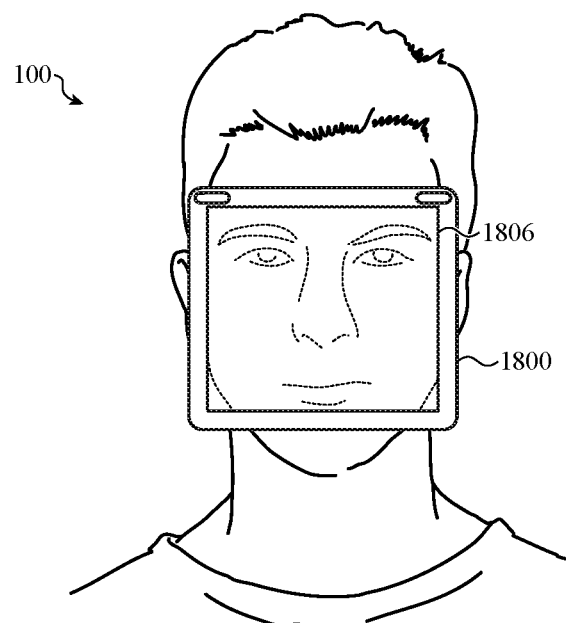

FIGS. 18A-18B show another example HMD 1800 that may be used with any of the systems and techniques described herein. In particular, the HMD 1800 may be substantially the same as the HMD 102 and may include the same and/or similar components of the HMD 102, but may be configured to cover a greater portion of the wearer's 100 face. The HMD 1800 may include an outward-facing display 1806, similar to the outward-facing display 106, which is configured to display images corresponding to and/or based on captured or stored images of the wearer. Because the HMD 1800 covers a greater portion of the wearer's face than the HMD 102, the outward-facing display 1806 may be larger than the outward-facing display 106 and may therefore display more features of the wearer's face, including for example the wearer's nose and mouth.

Figure 19:
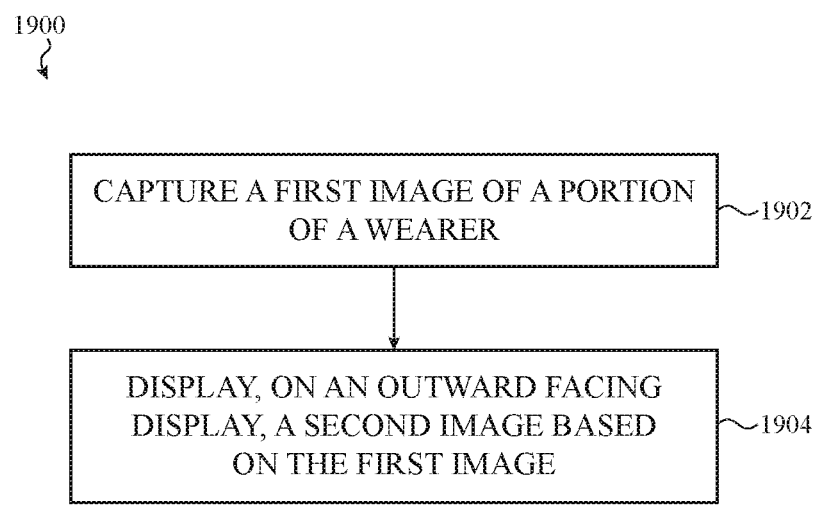
FIG. 19 depicts an example process of operating an HMD.

FIG. 19 shows an example process 1900 of operating an HMD, such as the HMD 102. The process 1900 may be used to display, on an outward-facing display, images of a wearer's face, or images corresponding to, selected based on, or derived from images of a wearer's face. For example, at operation 1902, the HMD may capture an image of a portion of the wearer of the HMD (or any other information or data about a wearer that can be used to generate or select an image that may correspond to or represent the wearer, including biometric data). For example, as described herein, the HMD may use a wearer-facing camera or other imaging device to capture an image of a portion of the wearer's face that is covered by the HMD (e.g., the wearer's eyes and surrounding areas).

At operation 1904, the HMD may display, on an outward-facing display of the head-mounted display, a second image that is based on the first image. The second image may be the first image (e.g., the first image may be output directly on the outward-facing display with no modification or adjustment. In other cases, the second image may be a modified version of the first image. For example, a parameter of the first image, including hue, contrast, brightness, or saturation, may be modified to produce the second image. As another example, the first image may be stretched, skewed, filtered, rotated, or otherwise manipulated to produce the second image. As yet another example, the first image may be analyzed to determine motion information (e.g., motion vectors of facial features or eye movements), which may then be applied to a manipulable digital model to produce the second image. As yet another example, the first image may be analyzed to determine an emotional state of the wearer, and the second image may be selected, based on the first image, from a group of candidate images.

As described herein, images may be still images, video images, animated images, patterns, shapes, light array patterns, or the like. Moreover, images that are selected based on an emotional state of the wearer may not be suggestive of the wearer's face. For example, animated flames may be presented as the second image if it is determined that the wearer is angry.

As noted herein, when the HMD is in a first mode of operation, the HMD may display images that are derived from or represent the wearer's face. For example, when the HMD is in a "home" mode with an "external engagement" status (see, e.g., FIG. 16A), the HMD may display the wearer's eyes. In other modes of operation, the HMD may display an image that corresponds to a scene being displayed on an inward-facing display of the HMD. For example, when the HMD is in a "home" mode with an "internal focus" status (see, e.g., FIG. 16A), the HMD may display what the wearer is viewing (as modified for a non-stereoscopic or other three-dimensional display technology).

Figure 20:
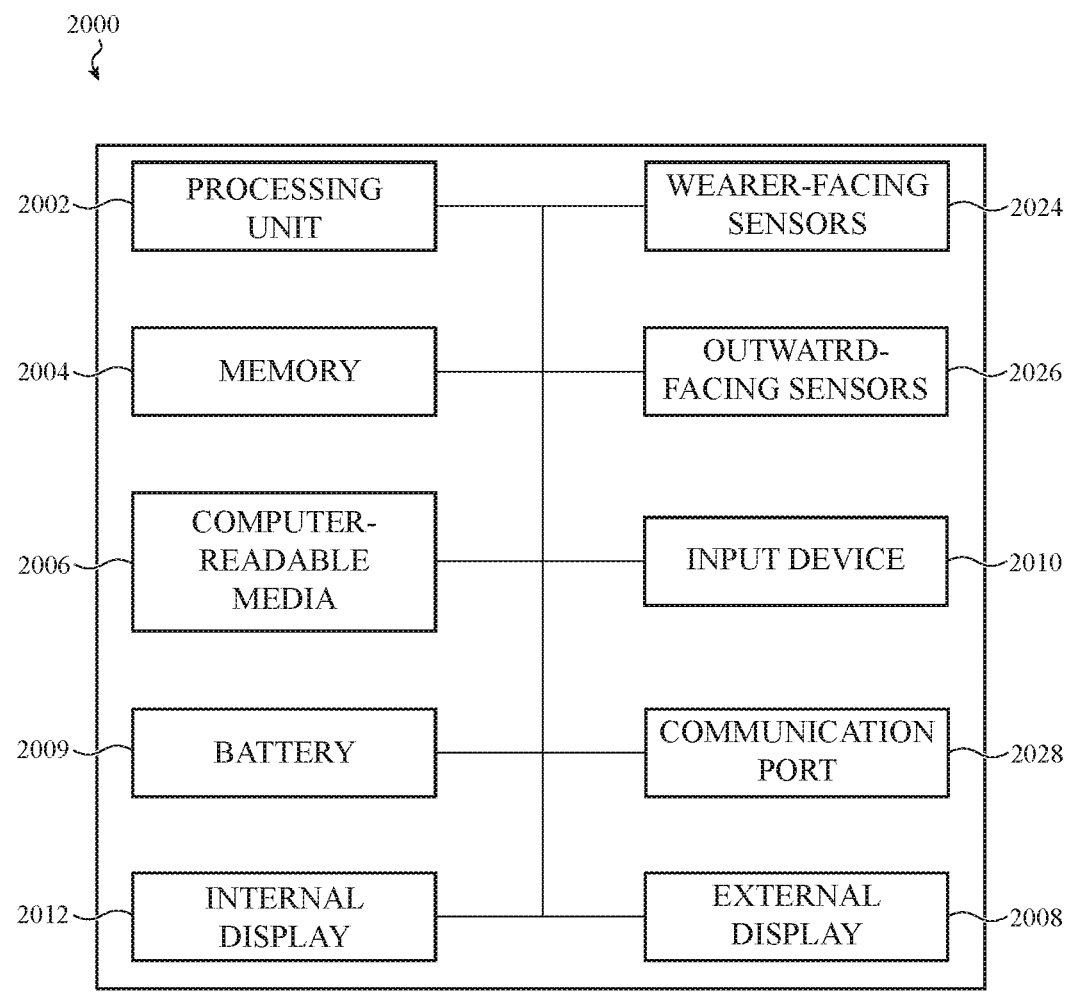
FIG. 20 depicts example components of an HMD.

FIG. 20 depicts example components of a head-mounted display in accordance with the embodiments described herein, such as the HMD 102 and/or the HMD 1800. As shown in FIG. 20, an HMD 2000 includes a processing unit 2002 operatively connected to computer memory 2004 and/or computer-readable media 2006. The processing unit 2002 may be operatively connected to the memory 2004 and computer-readable media 2006 components via an electronic bus or bridge. The processing unit 2002 may include one or more computer processors or microcontrollers that are configured to perform operations in response to computer-readable instructions. The processing unit 2002 may include the central processing unit (CPU) of the device. Additionally or alternatively, the processing unit 2002 may include other processors within the device including application specific integrated chips (ASIC) and other microcontroller devices.

The memory 2004 may include a variety of types of non-transitory computer-readable storage media, including, for example, read access memory (RAM), read-only memory (ROM), erasable programmable memory (e.g., EPROM and EEPROM), or flash memory. The memory 2004 is configured to store computer-readable instructions, sensor values, and other persistent software elements. Computer-readable media 2006 also includes a variety of types of non-transitory computer-readable storage media including, for example, a hard-drive storage device, a solid-state storage device, a portable magnetic storage device, or other similar device. The computer-readable media 2006 may also be configured to store computer-readable instructions, sensor values, and other persistent software elements.

In this example, the processing unit 2002 is operable to read computer-readable instructions stored on the memory 2004 and/or computer-readable media 2006. The computer-readable instructions may adapt the processing unit 2002 to perform the operations or functions described above with respect to FIGS. 1-19. For example, the processing unit 2002, the memory 2004, and/or the computer-readable media 2006 may be configured to cooperate with the wearer-facing sensors 2024, outward-facing sensors 2026, internal display(s) 2012 (e.g., wearer-facing display(s)), and external display(s) 2008 (e.g., outward-facing display(s)) to capture images a wearer of the HMD and display modified or unmodified versions of those images on the external display(s) 2008, as well as to capture images or information about a real world observer and display modified or unmodified versions of those images on the internal display(s) 2012. The computer-readable instructions may be provided as a computer-program product, software application, or the like.

As shown in FIG. 20, the HMD 2000 also includes one or more internal displays 2012 (e.g., the user-facing displays 1702, 1704) and one or more external displays 2008 (e.g., the outward-facing display 106). The internal display(s) 2012 and the external display(s) 2008 may include liquid-crystal display(s) (LCD), organic light emitting diode (OLED) display(s), LED display(s), or the like. If a display is an LCD, it may also include a backlight component that can be controlled to provide variable levels of display brightness. If a display is an OLED or LED type display, the brightness of the display may be controlled by modifying the electrical signals that are provided to display elements. The internal display(s) 2012 may be projector-type displays, such as retinal projectors that project images or other information that can be visually perceived by a wearer.

The HMD 2000 may also include a battery 2009 that is configured to provide electrical power to the components of the HMD 2000. The battery 2009 may include one or more power storage cells that are linked together to provide an internal supply of electrical power. The battery 2009 may be operatively coupled to power management circuitry that is configured to provide appropriate voltage and power levels for individual components or groups of components within the HMD 2000. The battery 2009, via power management circuitry, may be configured to receive power from an external source, such as an AC power outlet. The battery 2009 may store received power so that the HMD 2000 may operate without connection to an external power source for an extended period of time, which may range from several hours to several days.

In some embodiments, the HMD 2000 includes one or more input devices 2010. An input device 2010 is a device that is configured to receive user input. The one or more input devices 2010 may include, for example, a push button, a touch-activated button, a keyboard, a key pad, a motion capture system, an accelerometer, or the like (including any combination of these or other components). In some embodiments, the input device 2010 may provide a dedicated or primary function, including, for example, a power button, volume buttons, home buttons, scroll wheels, and camera buttons.

The HMD 2000 may also include wearer-facing sensors 2024 that may be used to sense, capture, and/or detect information about a wearer of the head-mounted display (including video and/or still images). Example wearer-facing sensors 2024 include, without limitation, cameras, eye-tracking sensors, biometric sensors (e.g., heart rate, blood oxygen, respiration rate, perspiration rate), motion sensors, presence sensors (e.g., to detect whether the HMD 102 is currently being worn), or the like.

The HMD 2000 may also include outward-facing sensors 2026 that may be used to sense, capture, and/or detect information about an environment surrounding the head-mounted display, including video and/or still images of the real-world environment and people in the real-world environment. Example outward-facing sensors 2026 include, without limitation, cameras, photo sensors, object detection sensors (e.g., radar sensors, light detection and ranging (LIDAR) sensors), ultrasonic sensors, light sensors, eye-tracking sensors, motion sensors, or the like.

The HMD 2000 may also include other sensors that may be used to detect an environmental condition, orientation, position, or some other aspect of the HMD 2000 and which may not necessarily be categorized as a wearer-facing or outward-facing sensor. Example sensors that may also be included in the HMD 2000 include, without limitation, one or more accelerometers, gyrometers, inclinometers, goniometers, or magnetometers. Such sensors may also be broadly defined to include wireless positioning devices including, without limitation, global positioning system (GPS) circuitry, Wi-Fi circuitry, cellular communication circuitry, and the like.

The HMD 2000 may also include a communication port 2028 that is configured to transmit and/or receive signals or electrical communication from an external or separate device. The communication port 2028 may be configured to couple to an external device via a cable, adaptor, or other type of electrical connector. In some embodiments, the communication port 2028 may be used to couple the HMD 2000 to an accessory, including a dock or case, a stylus or other input device, a remote control, a motion-tracking or motion-capture accessory, smart-clothing, pointing device, keyboard, or other device configured to send and/or receive electrical signals.

The concepts contained herein are described with reference to head mounted displays of various particular configurations. However, these concepts apply equally or by analogy to head mounted displays or wearable electronic devices or systems of other configurations as well, including without limitation visors, glasses, goggles, contact lenses, implantable devices, helmets (e.g., motorcycle helmets), or the like.

Further, HMDs or other devices with outward-facing displays, as described herein, may provide other features and benefits that increase the options for using the HMD in an interactive way and that leverage some of the concepts and techniques described herein. For example, an outward-facing display may be used to display, to an external observer, a virtual environment with which both the observer and the wearer can interact. More particularly, if an external observer wishes to interact with a wearer of an HMD while the wearer is immersed in a virtual environment, the HMD may integrate the observer into the virtual environment. This may include, for example, generating an avatar representative of the observer in the virtual environment, and providing a graphical output showing the avatar (or the avatar's virtual viewpoint) on the outward-facing display. The observer may then be able to manipulate the avatar, for example, by physically interacting with the HMD (e.g., touching the outward-facing display), using a controller or a smartphone that is in communication with the HMD, or the like.

Because the HMD can show the virtual world with the avatar (or from the avatar's perspective) on the outward-facing display, the external observer can actually interact with the virtual environment (and interact with the wearer in the virtual environment) in ways that were previously not offered. From the wearer's perspective, the external observer can be integrated into a virtual environment as described herein with respect to FIGS. 15A-15D, for example. Accordingly, the wearer need not leave the virtual environment or remove the HMD in order to interact with an external observer, while the external observer can have a more fulfilling and natural interaction with the wearer, and even participate in the wearer's virtual experience.

Further, any of the techniques described herein relating to integrating real-time expressions and/or images of the wearer and an observer into a virtualized environment may also be used to enhance the foregoing mutual-virtual experience. For example, cameras or other sensors may detect a wearer's facial expressions, gaze direction, or other features or expressions, which may be mapped or applied to an avatar of the wearer (which may be displayed on the outward-facing display to the observer). As another example, cameras or other sensors may detect the observer's facial expressions, gaze direction, or other features or expressions, which may be mapped or applied to an avatar of the observer (which may be displayed on the inward-facing display to the wearer). Accordingly, the techniques described herein for enhancing interaction between a wearer and an observer are applicable to this and other examples of shared virtual experiences.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A head-mounted device comprising:
    a housing;
    a wearer-facing camera positioned in the housing and configured to capture a first image of a portion of a wearer's face;
    an outward-facing display positioned in the housing and configured to display a second image of the portion of the wearer's face, the second image based on the captured first image;
    an outward-facing sensing system configured to:
        detect a lighting condition of an environment surrounding the head-mounted device; and
        determine a position of an external observer relative to the outward-facing display, wherein the position of the external observer relative to the outward-facing display changes over time; and
    a processor operatively coupled to the wearer-facing camera, the outward-facing display, and the outward-facing sensing system and configured to produce the second image of the portion of the wearer's face by:
        modifying the captured first image based at least in part on the detected lighting condition of the environment surrounding the head-mounted device; and
        repeatedly modifying the captured first image based at least in part on the position of the external observer relative to the outward-facing display as the position of the external observer relative to the outward-facing display changes over time.

2. The head-mounted device of claim 1, wherein modifying the captured first image based at least in part on the detected lighting condition of the environment surrounding the head-mounted device comprises changing a brightness of the second image.

3. The head-mounted device of claim 1, wherein:
    the lighting condition is a first lighting condition; and
    the outward-facing sensing system is further configured to detect a second lighting condition of the environment surrounding the head-mounted device, the second lighting condition different from the first lighting condition.

4. The head-mounted device of claim 3, wherein:
    the first lighting condition is a light intensity; and
    the second lighting condition is a light direction.

5. The head-mounted device of claim 1, wherein:
    the lighting condition is light color; and
    modifying the captured first image comprises changing a color of at least a portion of the first image.

6. The head-mounted device of claim 1, wherein:
    the first image of the portion of the wearer's face is a real-time video image of the wearer's eyes; and
    the second image of the portion of the wearer's face is a modified real-time video image of the wearer's eyes.

7. The head-mounted device of claim 1, wherein:
    the lighting condition is a light direction; and
    modifying the captured first image of the portion of the wearer's eyes comprises adding a shadow to the first image, the position of the shadow defined at least in part on the light direction.

8. The head-mounted device of claim 1, wherein:
    in a first mode of operation, the second image is displayed on the outward-facing display; and
    in a second mode of operation, the outward-facing display is inactive.

9. The head-mounted device of claim 8, wherein the processor is configured to:
    in response to a determination that the external observer is present, operate the head-mounted device in the first mode of operation; and
    in response to a determination that the external observer is not present, operate the head-mounted device in the second mode of operation.

10. A head-mounted display system comprising:
    a first display configured to display content to a wearer;
    a second display configured to display content away from the wearer;
    a camera configured to capture a video image of the wearer's eyes;
    a sensing system configured to:
        detect a lighting condition of an environment surrounding the head-mounted display system; and
        determine a position of the head-mounted display system relative to an external observer, the position of the head-mounted display system varying, relative to the external observer, over time;
    a processor operatively coupled to the camera and the sensing system and configured to:
        modify the video image of the wearer's eyes in real-time based at least in part on:
            the lighting condition; and
            the position of the head-mounted display system as the position of the head-mounted display system varies, relative to the external observer, over time; and
        cause the modified video image to be displayed on the second display.

11. The head-mounted display system of claim 10, wherein:
    in a first mode of operation, the modified video image is displayed on the second display; and
    in a second mode of operation, the second display is inactive.

12. The head-mounted display system of claim 11, wherein the processor is configured to:
in response to a determination that the external observer is present, operate the head-mounted display system in the first mode of operation; and
in response to a determination that the external observer is not present, operate the head-mounted display system in the second mode of operation.

13. The head-mounted display system of claim 10, wherein modifying the video image comprises changing a brightness of the video image.

14. The head-mounted display system of claim 10, wherein modifying the video image comprises modifying the video image such that the video image of the wearer's eyes, as displayed on the second display, conforms to contours of the wearer's face.

15. The head-mounted display system of claim 10, wherein:
the camera is a first camera;
the head-mounted display system further comprises a second camera configured to capture a video image of the external observer; and
the processor is further configured to display the video image of the external observer on the first display.

16. A head-mounted device comprising:
a housing;
a wearer-facing display positioned within the housing and configured to display at least partially virtual content to a wearer;
a wearer-facing sensing system positioned in the housing and configured to capture data corresponding to a facial expression of the wearer;
an outward-facing display positioned in the housing and configured to display a first image including a portion of the wearer's face;
an outward-facing sensing system configured to detect a lighting condition of an external environment and detect a varying position of an external observer relative to the wearer over time; and
a processor operatively coupled to the wearer-facing display, the wearer-facing sensing system, the outward-facing display, and the outward-facing sensing system and configured to:
produce the first image of the portion of the wearer's face by modifying a captured second image of the wearer based at least in part on the detected lighting condition and the facial expression of the wearer; and
in response to detecting the varying position of the external observer relative to the wearer, periodically modify the captured second image of the wearer based at least in part on the varying position of the external observer.

17. The head-mounted device of claim 16, wherein detecting the lighting condition comprises detecting whether the lighting is diffuse or directional.

18. The head-mounted device of claim 17, wherein in response to detecting that the lighting condition is directional, modifying the captured second image of the wearer comprises adding a highlight to the captured second image.

19. The head-mounted device of claim 16, wherein:
detecting the lighting condition comprises detecting a light intensity of the external environment; and
in response to detecting that the lighting condition is directional, modifying the captured second image of the wearer comprises changing a brightness of the captured second image based at least in part on the light intensity of the external environment.

20. The head-mounted device of claim 16, wherein the processor is further configured to:
in response to a determination that the external observer is present and the wearer-facing display is displaying a mixed-reality environment, cause the outward-facing display to display the first image; and
in response to a determination that the external observer is present and the wearer-facing display is displaying an entirely virtual environment, perform at least one of:
deactivating the outward-facing display; or
displaying a third image on the outward-facing display.

* * * * *